United States Patent
Sumiyoshi

(10) Patent No.: US 9,507,221 B2
(45) Date of Patent: Nov. 29, 2016

(54) LIQUID CRYSTAL LENS ELEMENT, DISPLAY UNIT AND TERMINAL

(71) Applicant: NLT Technologies, Ltd., Kanagawa (JP)

(72) Inventor: Ken Sumiyoshi, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 317 days.

(21) Appl. No.: 14/146,412

(22) Filed: Jan. 2, 2014

(65) Prior Publication Data

US 2014/0192298 A1    Jul. 10, 2014

(30) Foreign Application Priority Data

Jan. 7, 2013   (JP) .................................. 2013-000348

(51) Int. Cl.
 *G02F 1/1343* (2006.01)
 *G02B 27/22* (2006.01)
 *G02F 1/29* (2006.01)
 *H04N 13/04* (2006.01)

(52) U.S. Cl.
 CPC ..... *G02F 1/134336* (2013.01); *G02B 27/2214* (2013.01); *G02F 1/1343* (2013.01); *G02F 1/134309* (2013.01); *G02F 1/29* (2013.01); *H04N 13/0404* (2013.01); *H04N 13/0452* (2013.01); *G02F 2001/291* (2013.01); *H04N 2213/001* (2013.01)

(58) Field of Classification Search
 None
 See application file for complete search history.

(56) References Cited

U.S. PATENT DOCUMENTS

| 8,547,488 | B2 | 10/2013 | Kim et al. | |
| 8,988,619 | B2 | 3/2015 | Oka et al. | |
| 2004/0169630 | A1* | 9/2004 | Ide | G02F 1/134309 345/96 |
| 2010/0157181 | A1 | 6/2010 | Takahashi | |
| 2012/0113336 | A1* | 5/2012 | Kim | G02F 1/134363 349/15 |
| 2012/0120331 | A1 | 5/2012 | Oka et al. | |

(Continued)

FOREIGN PATENT DOCUMENTS

| JP | 2010-170068 | 8/2010 |
| JP | 2011-017742 | 1/2011 |

(Continued)

OTHER PUBLICATIONS

Extended European Search Report dated Apr. 8, 2014, with English translation; Application No. 14150135.3.

(Continued)

*Primary Examiner* — Ryan Crockett
(74) *Attorney, Agent, or Firm* — Young & Thompson

(57) ABSTRACT

Provided are a liquid crystal lens element, a display unit and a terminal. The liquid crystal lens element includes an upper substrate, a lower substrate and a liquid crystal layer, where directions in which each of the upper and lower substrates extends are defined as the x-direction and the y-direction. An initial molecular orientation direction of the liquid crystal layer agrees with the x-direction. The upper substrate includes a repetition area in which plural A-electrode structures are arrayed in the x-direction so as to generate an electric potential gradient in the x-direction. The lower substrate includes a repetition area in which plural B-electrode structures are arrayed in the y-direction so as to generate an electric potential gradient in the y-direction. One of an opening section and a central electrode elongated in the y-direction is formed in the middle of each A-electrode structure.

4 Claims, 17 Drawing Sheets

(56) References Cited

U.S. PATENT DOCUMENTS

2012/0162592 A1* 6/2012 Takagi ............... G02B 27/2214
    349/139
2012/0242913 A1* 9/2012 Miyazawa ............... G02B 3/12
    349/5

FOREIGN PATENT DOCUMENTS

| JP | 2011-150344 | 8/2011 |
|---|---|---|
| JP | 2012-98689 | 5/2012 |
| JP | 2012-108194 | 6/2012 |

OTHER PUBLICATIONS

Susumu Sato, Masaru Uchida and Marenori Kawamura, "Liquid-Crystal Optical Device With Dielectric-Constant Distribution Layer" Japanese Liquid Crystal Conference (2010) PA52.

Susumu Sato, Masaru Uchida and Marenori Kawamura, "Drive Frequency Characteristics of Liquid-Crystal Optical Device with Impedance Distribution Layer" Japanese Liquid Crystal Conference (2011) PB49.

Japanese Official Action—2013-000348—Oct. 4, 2016.

* cited by examiner

FIG. 1
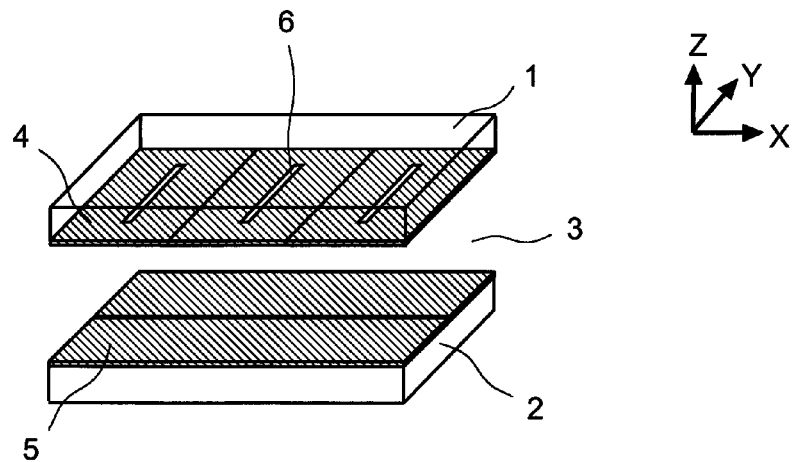
FIG. 2A
FIG. 2B
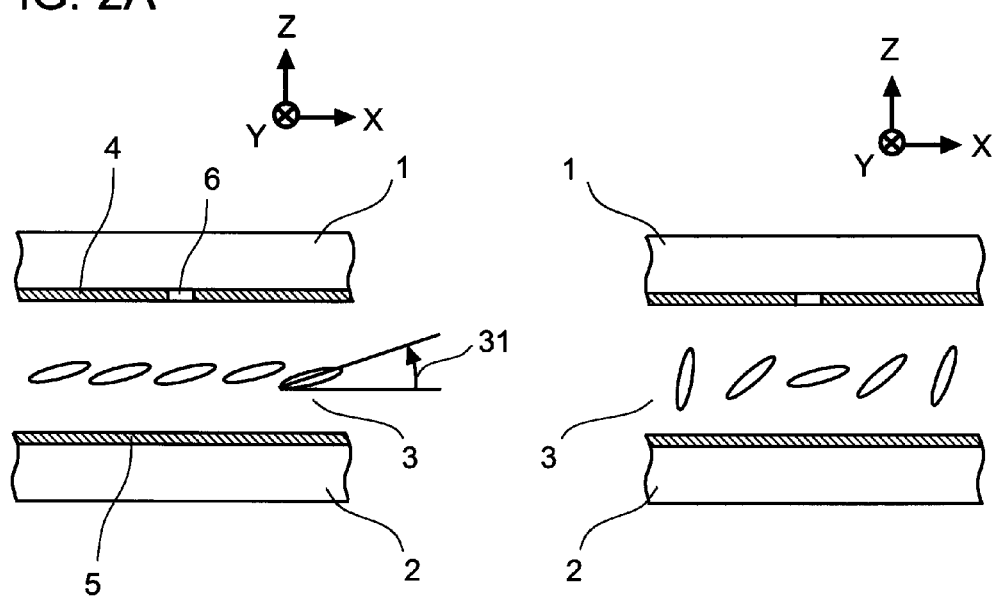

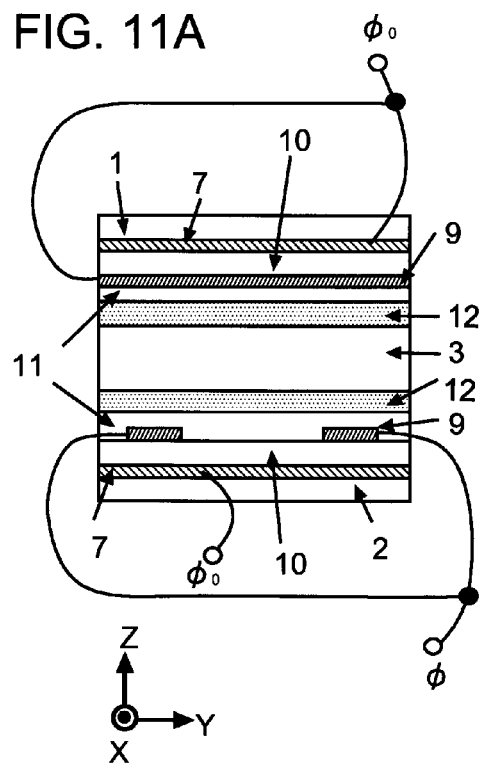
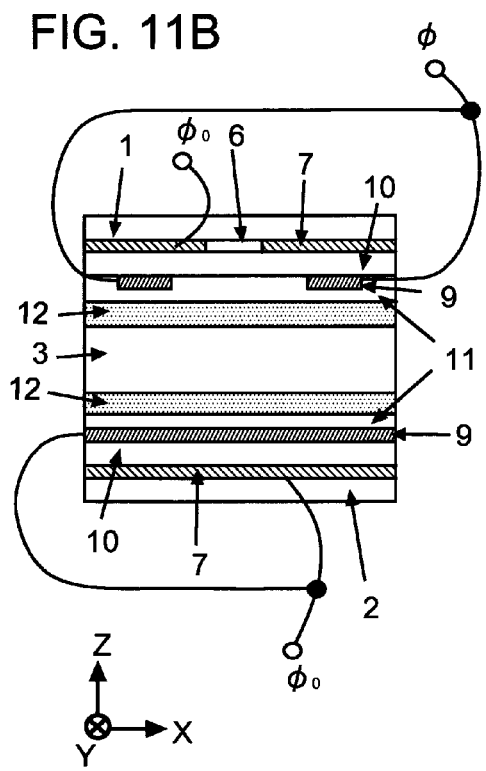
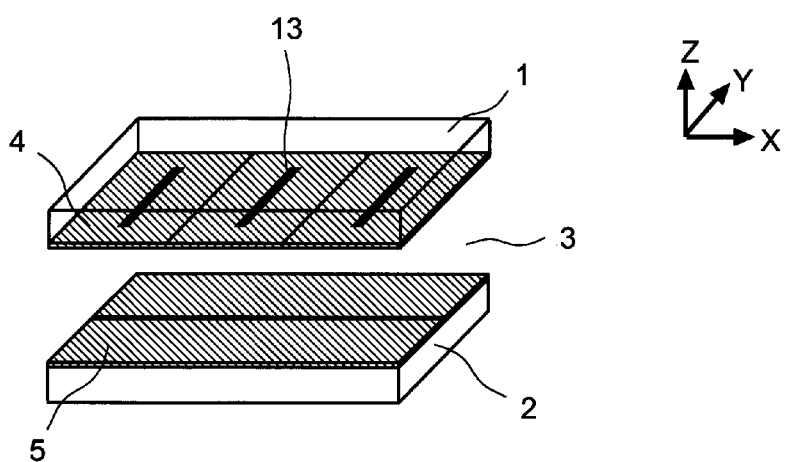

▨ FIRST CONDUCTIVE LAYER
▨ SECOND CONDUCTIVE LAYER

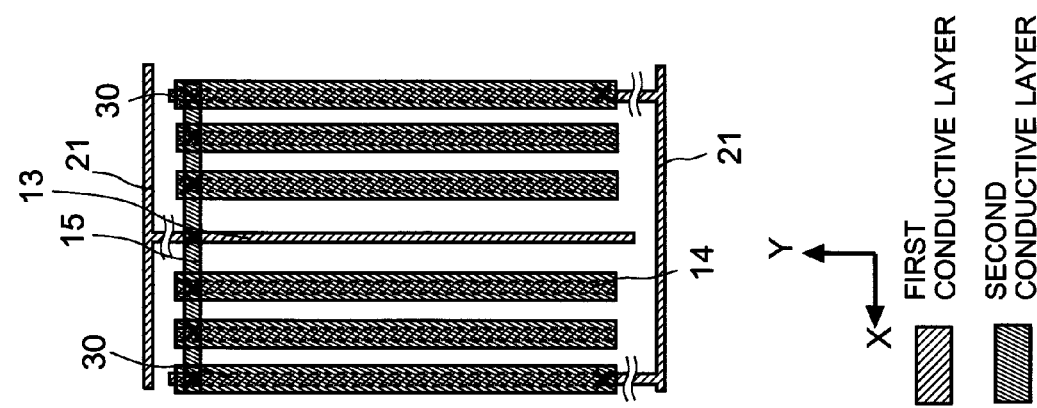
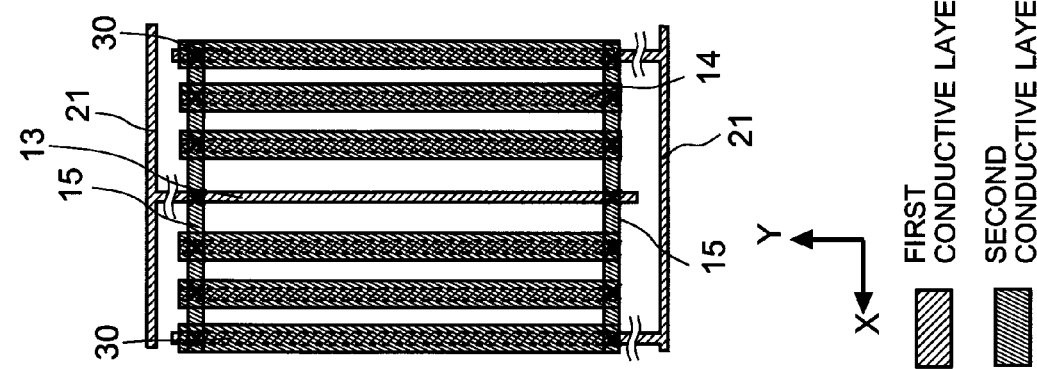
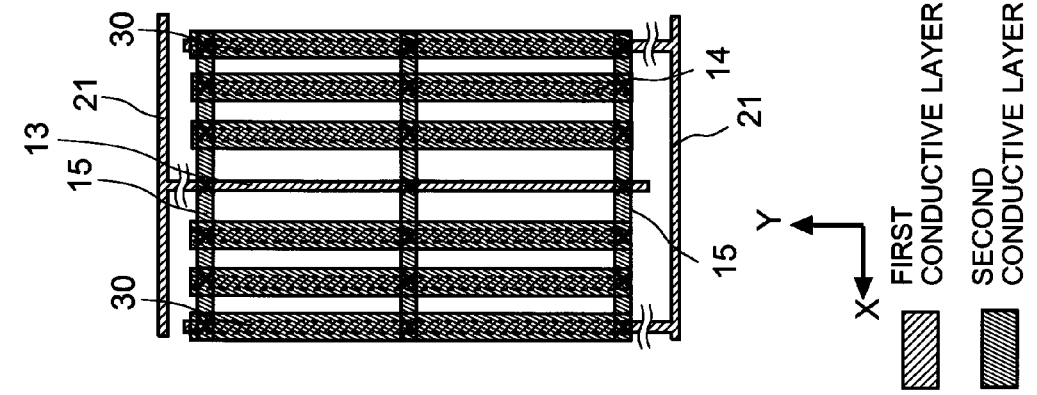

FIG. 20A
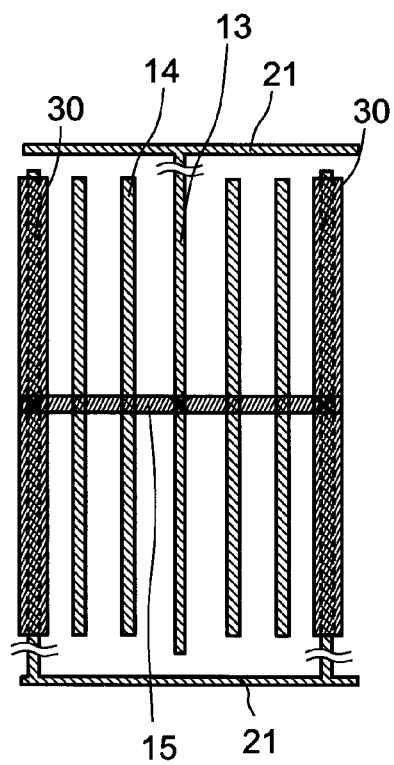
FIG. 20B
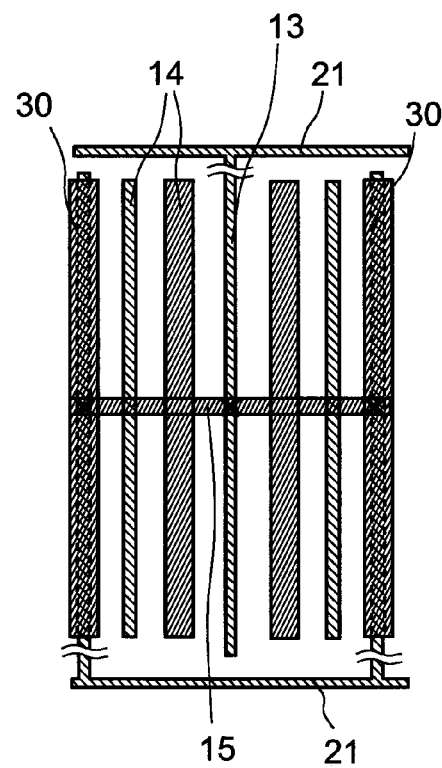
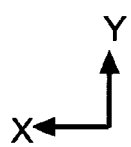
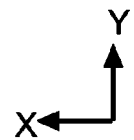
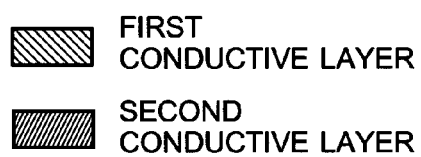

FIG. 21A FIG. 21B FIG. 21C

FIG. 25A
Related Art
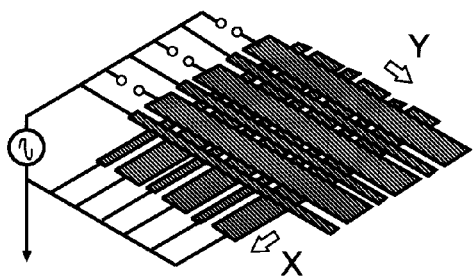
FIG. 25B
Related Art
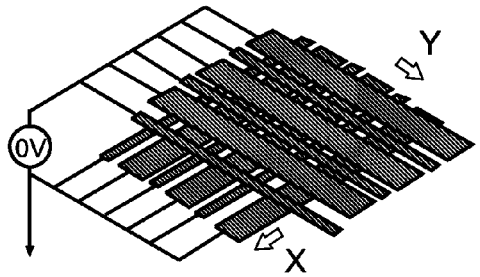
FIG. 25C
Related Art
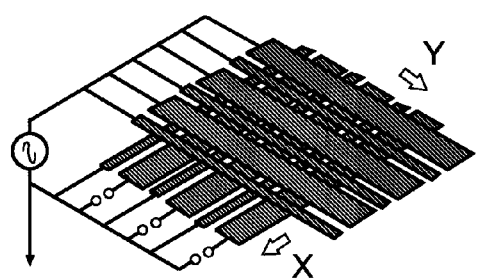
FIG. 26A
Related Art
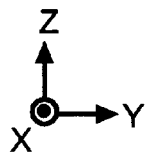 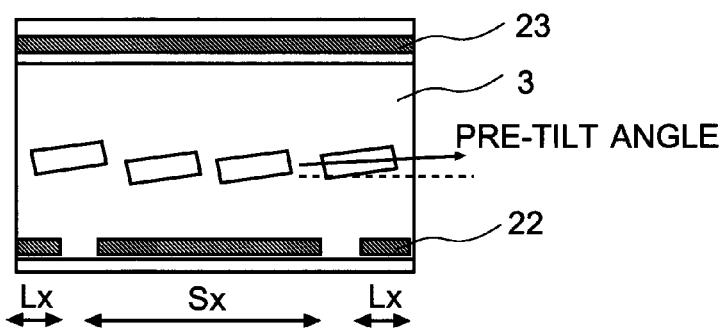
FIG. 26B
Related Art
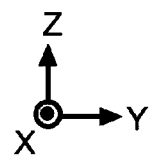 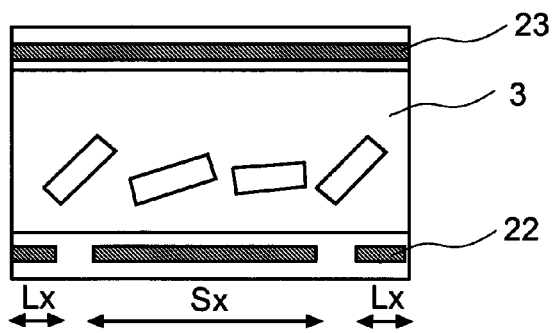

LIQUID CRYSTAL LENS ELEMENT, DISPLAY UNIT AND TERMINAL

TECHNICAL FIELD

The present invention relates to a liquid crystal lens element, display unit equipped with the liquid crystal lens element, and a terminal equipped with the display unit.

BACKGROUND

Display devices which can display stereoscopic images are now making significant progress. Those stereoscopic image display devices can be roughly categorized into those to be viewed with glasses and those to be viewed with naked eyes. Especially, the display apparatuses by which stereoscopic images can be viewed with naked eyes do not bother users to wear glasses, and are expected to come into wide use. As the stereoscopic display device by which naked eyes can perceive stereoscopic images, display devices which employ cylindrical lenses or a parallax barrier arranged in front of a display unit are generally used. In those display devices, pixels for the right eye and pixels for the left eyes are prepared in the display unit and those pixels are arranged so as to transmit information of each pixel to eyes of an observer through the cylindrical lenses or the parallax barrier. Therefore, the cylindrical lenses are arranged such that the direction of cylinders agrees with the vertical direction of the screen of the display unit, and the parallax barrier is arranged such that the direction of its light-shielding slits agrees with the vertical direction of the screen.

On the other hand, small-sized liquid-crystal display units are now widely used in the field of portable handheld devices such as portable game machines and mobile phones. Since those portable handheld devices are developed on the assumption that they are driven by batteries, display units with smaller power consumption are required in the field of portable handheld devices. In the field of portable handheld devices, the way to use a device such that the device is turned in a user's hand to change its screen from the portrait orientation to the landscape orientation, and vice versa, according to an application program executed thereon, has been widespread. Folding mobile phones which can be used by turning just a display unit by 90 degrees so as to change its screen from the portrait orientation to the landscape orientation are now in the market. In the field of smart phones, devices which can switch the screen between the portrait orientation and the landscape orientation freely by turning the device in a user's hand from the portrait position to the landscape position, are becoming popular.

In view of the above situation, development of display devices which can switch the screen between the portrait orientation and the landscape orientation and can display stereoscopic images in both of the portrait-orientation use and landscape-orientation use, have got to be considered. As a typical technology to realize such display devices, the technology disclosed in Japanese Unexamined Patent Application Publication (JP-A) No. 2010-170068 has been proposed. This technology will be described with reference to FIG. 23. There is provided a display unit composed of lens array element 24 and display panel 25. Lens array element 24 is a switching array element using liquid crystal, and includes first electrode group 22 extending in the X-direction on a lower substrate and second electrode group 23 extending in the Y-direction on an upper substrate. FIG. 24 illustrates a detailed perspective view of the lens array element 24. In FIG. 24, there are provided electrodes 27 and 26 with two types of width (Lx, Sx) extending in the X-direction on one of substrates. On the other of the substrates shown in FIG. 24, there are provided electrodes 28 and 29 with two types of width (Ly, Sy) extending in the Y-direction. Molecules of liquid crystal are oriented in one direction initially.

The above-described electrodes can be driven in three states illustrated in FIGS. 25A to 25C. FIG. 25A illustrates the first state that an electric potential gradient is generated in the X-direction and a uniform electric potential distribution is generated in the Y-direction. Therefore, the alignment of liquid crystal molecules has a cyclic distribution in the X-direction. One cycle of the distribution is defined by a distance from one electrode with width Ly to the next electrode with width Ly, as one unit. Such the structure provides a liquid crystal lens which works in the optically same manner as cylindrical lenses extending in the Y-direction and each having the same width as the above distance. When a display panel having pixels for the left eye and pixels for the right eyes arrayed in the X-direction is layered on the lens array element in the above state, a stereoscopic image display device wherein the vertical direction of the screen agrees with the Y-direction can be obtained.

Next, FIG. 25B illustrates the second state that no voltage difference is made between the upper and lower substrates and molecules of liquid crystal are oriented parallel with the substrates. Since the liquid crystal does not have a refractive-index distribution in this state, the liquid crystal works as a transparent body. When a display panel is layered on the lens array element in this state, the display panel works as a normal display panel for 2D display.

Further, FIG. 25C illustrates the third state that an electric potential gradient is generated in the Y-direction. Such the structure provides a liquid crystal lens which works in the optically same manner as cylindrical lenses extending in the X-direction and each having a width from one electrode with width Lx to the next electrode with width Lx as one unit. Thereby, when a display panel having pixels for the left eye and pixels for the right eyes arrayed in the Y-direction is layered on the lens array element in the above state, a stereoscopic image display device wherein the vertical direction of the screen agrees with the X-direction can be obtained.

As described above, use of a lens array element having the structure illustrated in FIG. 24, allows a display device to carry out the three types of display including the stereoscopic image display whose vertical direction agrees with the Y-direction, the normal 2D display, and the stereoscopic image display whose vertical direction agrees with the X-direction.

However, the lens array element illustrated in FIG. 24 hardly realizes the same lens operations in both of the X-direction and the Y-direction. This problem will be described with reference to FIGS. 26A and 26B. FIG. 26A is a sectional view illustrating a molecular alignment state when no voltage is applied to the lens array element and the lens array element shown in FIG. 24 is viewed from the X-direction. In FIG. 26A, molecules of liquid crystal have been oriented in the Y-direction in the initial state, and they have an alignment almost parallel with the substrates at a very small pre-tilt angle with the substrates.

FIG. 26B is a sectional view illustrating the molecular alignment state when a voltage is applied between the upper and lower substrates of the above lens array element. In FIG. 26B, since a voltage is applied to the liquid crystal layer between the substrates, the molecules are rotated toward the vertical orientation from the orientation of the substrate surfaces. Since this molecular state is defined based on the direction of the initial pre-tilt angle, the molecular alignment becomes asymmetric about the center of the electrode with width Sx as shown in FIG. 26B. As can be seen from FIG. 26B, the state of liquid crystal molecules on applying a voltage thereto becomes asymmetric, while the electrode structure is symmetric about the center of the electrode with width Sx. Such the lens array element merely forms asymmetric cylindrical-lens structures extending in the X-direction above the electrodes with width Sx.

On the other hand, FIG. 27A illustrates a molecular alignment state when no voltage is applied to the lens array element and the lens array element shown in FIG. 24 is viewed from the Y-direction. Since molecules of liquid crystal have been oriented in the Y-direction in the initial state, the molecules along the electrodes with width Sy have an alignment which has symmetry from the initial state. Therefore, also in the state that a voltage is applied between the upper and lower substrates as illustrated in FIG. 27B, the symmetric alignment of liquid crystal molecules about the center of the electrode with Sy width can be obtained. Such the lens array element forms symmetric cylindrical-lens structures above the electrodes with width Sy.

As described above, it can be found that when the liquid crystal molecules have been oriented in the Y-direction in the initial state, only asymmetric cylindrical-lens structures, which extend in the X-direction, are provided in the third state among the three states shown in FIGS. 25A to 25C. Further, it can be found that when the liquid crystal molecules have been oriented in the X-direction in the initial state, only asymmetric cylindrical-lens structures, which extend in the Y-direction as a perpendicular direction to the initial orientation direction of the liquid crystal molecules (the X-direction), are provided in the first state among the three states shown in FIGS. 25A to 25C.

When a stereoscopic display device carries out 3D display by using the above asymmetric cylindrical-lens structures, it is difficult to perform a separation of light to the left eye and the right eye of an observer properly. It results in an increase of the amount of 3D crosstalk and in a brightness difference between light perceived by the right eye and light perceived by the left eye. Therefore, it is difficult for such the stereoscopic display device to realize stereoscopic image display of high quality. Further, when the degree of the asymmetry is significant, it becomes impossible for such the stereoscopic display device even to present stereoscopic images for observers.

SUMMARY

There are disclosed illustrative liquid crystal lens elements, illustrative display units and illustrative terminals, which allow the display units and the terminals to display stereoscopic images with keeping brightness of the screen under both of the condition that the screen is in the portrait position and the condition that the screen is the landscape position (hereinafter, referred as "portrait 3D display" and "landscape 3D display"), and additionally to display normal images other than stereoscopic images (hereinafter, referred as 2D display).

An illustrative liquid crystal lens element comprises: an upper substrate and a lower substrate facing each other, and a liquid crystal layer put between the upper substrate and the lower substrate, where directions in which each of the upper substrate and the lower substrate extends are defined as a x-direction and a y-direction which cross each other. An initial molecular orientation direction of the liquid crystal layer agrees with the x-direction. The upper substrate includes a repetition area in which a plurality of A-electrode structures are arrayed in the x-direction so as to generate an electric potential gradient in the x-direction. The lower substrate includes a repetition area in which a plurality of B-electrode structures are arrayed in the y-direction so as to generate an electric potential gradient in the y-direction. One of an opening section elongated in the y-direction and a central electrode elongated in the y-direction is formed in the middle of each of the plurality of A-electrode structures.

An illustrative display unit comprises a layered body including a display panel, a polarization plate and the above liquid crystal lens element in this order.

An illustrative terminal comprises the above display unit.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 1 is a diagram illustrating a structure of a liquid crystal lens element of the first embodiment;

FIGS. 2A and 2B are diagrams illustrating operations to orient molecules of liquid crystal of the liquid crystal lens element of the first embodiment;

FIGS. 11A and 11B are diagrams illustrating a way to drive the liquid crystal lens element of the third embodiment;

FIG. 12 is a diagram illustrating an arrangement of electrodes of a liquid crystal lens element of the fourth embodiment;

FIGS. 19A to 19C are diagrams illustrating an arrangement of electrodes of a liquid crystal display panel of the second example;

FIGS. 20A and 20B are diagrams illustrating an arrangement of electrodes of a liquid-crystal display panel of the third example;

FIGS. 21A to 21C are diagrams illustrating an arrangement of electrodes of a liquid-crystal display panel of the third example;

Figure 27A:
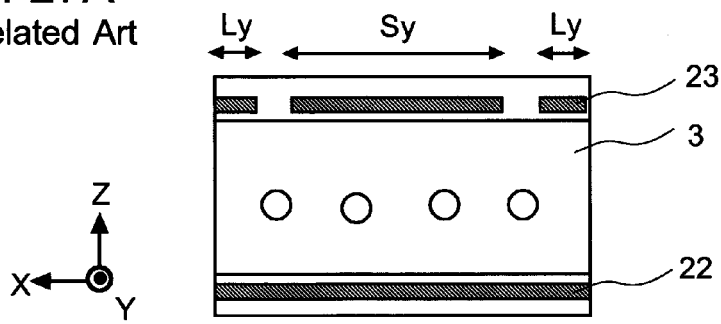
Figure 27B:
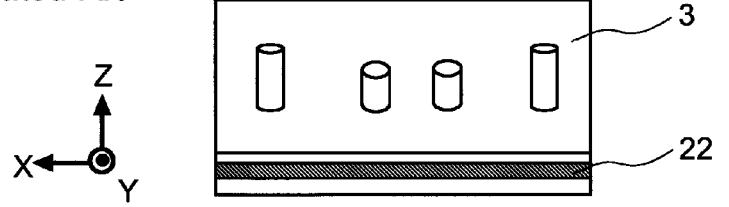
Figures 28A, 28B:
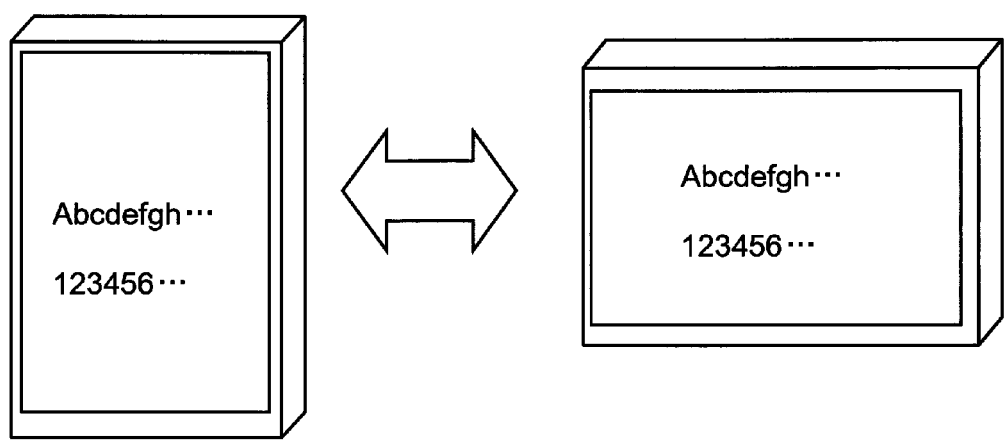

Each of FIGS. 25A to 25C is a diagram illustrating a way to drive a conventional lens array element;

FIGS. 26A and 26B are diagrams illustrating a problem about a conventional lens array element;

FIGS. 27A and 27B are diagrams illustrating a problem about a conventional lens array element; and Each of FIGS. 28A and 28B is a sectional view illustrating a terminal of the seventh embodiment.

DETAILED DESCRIPTION

Illustrative embodiments of liquid crystal lens elements, display units and terminals will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

A first embodiment of the present invention is a liquid crystal lens element comprising: an upper substrate and a lower substrate facing each other, and a liquid crystal layer put between the upper substrate and the lower substrate, where directions in which each of the upper substrate and the lower substrate extends are defined as a X-direction and a Y-direction which cross each other. An initial molecular orientation direction of the liquid crystal layer agrees with the X-direction. The upper substrate includes a repetition area in which a plurality of A-electrode structures are arrayed in the X-direction so as to generate an electric potential gradient in the X-direction. The lower substrate includes a repetition area in which a plurality of B-electrode structures are arrayed in the Y-direction so as to generate an electric potential gradient in the Y-direction. An opening section elongated in the Y-direction is formed in the middle of each of the plurality of A-electrode structures.

The liquid crystal lens element of the first embodiment will be described with reference to FIG. 1. The liquid crystal lens is composed of upper substrate 1, lower substrate 2 and liquid crystal layer 3 put between these substrates. Assuming that the coordinate system is defined as shown in FIG. 1, the directions in which each of the substrates extend, that is, the in-plane directions of each of the substrates, agree with the directions of an X-Y plane (the X and Y directions). In the above liquid crystal lens element, the initial molecular orientation direction of the liquid crystal almost agrees with the X-direction. In this case, a small pre-tilt angle 31 may be formed between the initial molecular orientation direction and the X-direction. The above liquid crystal lens element further includes electrode structures (referred as A-electrode structures 4) which are arrayed cyclically in the X-direction on upper substrate 1 so as to generate an electric potential gradient in the X-direction. These electrode structures form a repetition area on a surface of upper substrate 1. The above liquid crystal lens element further includes another electrode structures (referred as B-electrode structures 5) which are arrayed cyclically in the Y-direction on lower substrate 2 so as to generate an electric potential gradient in the Y-direction. These electrode structures form a repetition area on a surface of lower substrate 2.

Operations of the liquid crystal lens element will be described with reference to FIGS. 2A and 2B. Each of FIGS. 2A and 2B illustrates a state of the molecular alignment of liquid crystal corresponding to one of the A-electrode structures shown in FIG. 1 within an X-Z cross section. Especially, FIG. 2A illustrates a state of the initial molecular alignment of liquid crystal, where no voltage is applied to the electrode structures. The molecules of liquid crystal are oriented almost parallel with the X-direction while forming a pre-tilt angle with the X-direction. When a voltage is applied between the A-electrode structures 4 and the B-electrode structures 5, the molecules of liquid crystal are oriented to be perpendicular to the substrates. At this time, the A-electrode structures 4 generate an electric potential gradient in the X-direction.

Figure 3A:
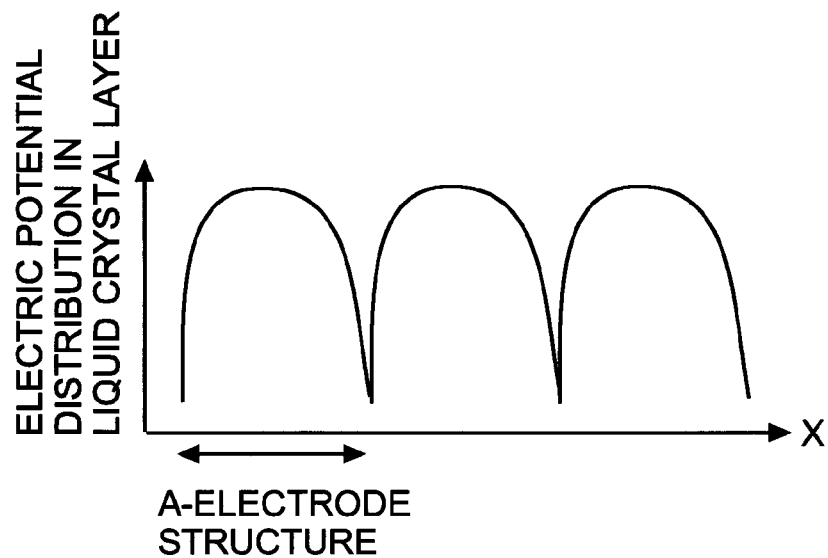
FIGS. 3A and 3B are diagrams illustrating a distribution of electric potential to be applied to a liquid crystal layer of the liquid crystal lens element of the first embodiment.
Figure 3B:
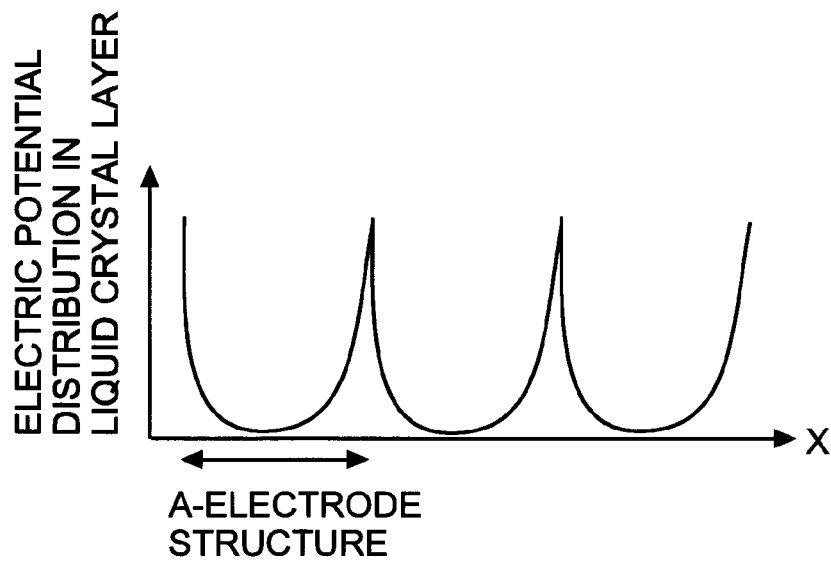

A concrete example of the A-electrode structures 4 will be described later. Now, actions of the A-electrode structures 4 are described with reference to FIGS. 3A and 3B. Each of FIGS. 3A and 3B illustrates an electric potential distribution to be applied to the liquid crystal layer in the cross section taken along the X-direction of FIG. 1. The A-electrode structures are arrayed in the X-direction within the repetition area, and form an electric potential distribution, as shown in FIG. 3A or FIG. 3B, to be applied to the liquid crystal layer. In FIG. 3A, the electric potential difference is maximized around the middle of each of the A-electrode structures and the refractive index of the liquid crystal layer is minimized around the middle of each of the A-electrode structures, so as to provide properties of concave lenses. On the other hand, in FIG. 3B, the electric potential difference is minimized around the middle of each of the A-electrode structures and the refractive index of the liquid crystal layer is maximized around the middle of each of the A-electrode structures, so as to provide properties of convex lenses. While functions of the A-electrode structures providing the convex-lens properties will be described below, the similar functions can be described for the A-electrode structures providing the concave-lens properties, too.

Figure 4A:
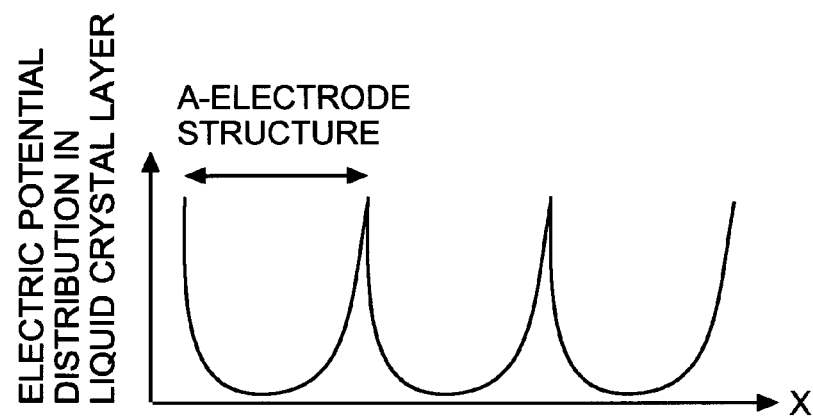
FIGS. 4A to 4C are diagrams illustrating the distribution of electric potential to be applied to the liquid crystal layer of the liquid crystal lens element relating to the first embodiment.
Figure 4B:
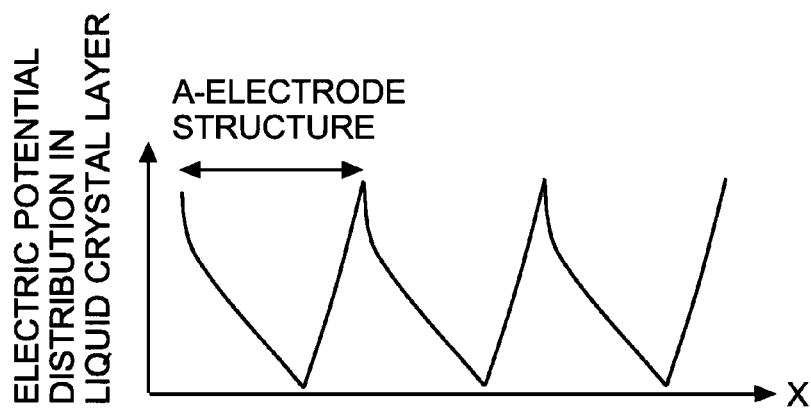
Figure 4C:
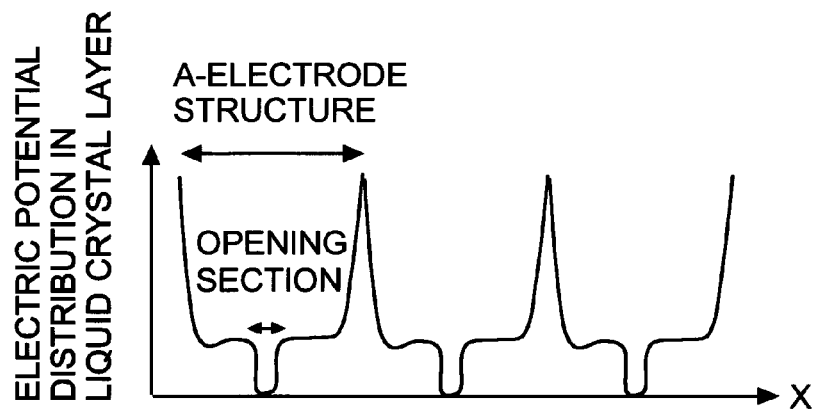

Each of FIGS. 4A to 4C illustrates an electric potential difference to be applied to the liquid crystal layer in the case of the convex-lens properties. FIG. 4A illustrates a symmetric electric potential distribution coming from an effect of the symmetric electrode structures. However, as described above, the pre-tilt angle of the liquid crystal layer actually makes the electric potential distribution asymmetric as shown in FIG. 4B. Such an electric potential distribution forms just an asymmetric electric potential distribution. On the other hand, in the liquid crystal lens element of the present embodiment, since an opening section is formed in the middle of each of the A-electrode structures, the electric potential difference around the opening section becomes almost zero. Therefore, as shown in FIG. 4C, areas of zero electric potential difference, each corresponding to the opening section at the middle of one of the A-electrode structures, appear in the electric potential distribution, which makes the electrical potential distribution symmetric in each of the A-electrode structures.

FIG. 2B illustrates a state of the molecular alignment of liquid crystal under the above electric potential distribution.

In FIG. 2B, a large electric potential difference is applied to the liquid crystal layer at the both edges of each the A-electrode structures and almost zero electric potential difference is applied to the liquid crystal layer in the middle of each of the A-electrode structures. Such the electric potential distribution causes the state of alignment of liquid crystal molecules as shown in FIG. 2B, which makes a symmetric refractive index distribution about the middle of each of the A-electrode structures.

In the liquid crystal lens element illustrated in FIG. 1, the direction in which the A-electrode structures are arrayed is orthogonal to the direction in which the B-electrode structures are arrayed. The structure of the liquid crystal lens element is not limited to that, and the A-electrode structures and the B-electrode structures may be arrayed so that those directions cross each other because of the following reason. The diagram of FIG. 2B teaches that almost zero electric potential difference is applied to the liquid crystal layer in the middle of each of the A-electrode structures even under the situation that the major axis direction of the liquid crystal molecules do not agree with the X-direction with accuracy. Therefore, the liquid crystal lens element in which the major axis direction of the liquid crystal molecules and the X-direction do not agree with each other can provide the same effect as that of the liquid crystal lens element in which those directions agree with each other, which means that there is no need to make the direction in which the A-electrode structures are arrayed and the major axis direction of the liquid crystal molecules agree with each other with accuracy. Accordingly, in the liquid crystal lens element of the present embodiment, the A-electrode structures and the B-electrode structures may be arrayed so that those directions at least cross each other.

A second embodiment of the present invention has a structure that each of the A-electrode structures of the liquid crystal lens element of the first embodiment includes a first conductive layer, an insulating layer and stripe structures formed of a second conductive layer, which are layered on the upper substrate. The first conductive layers of the plurality of A-electrode structures form an electrode covering the entire of the upper substrate, and the stripe structures formed of the second conductive layer extend in the Y-direction.

Figure 5:
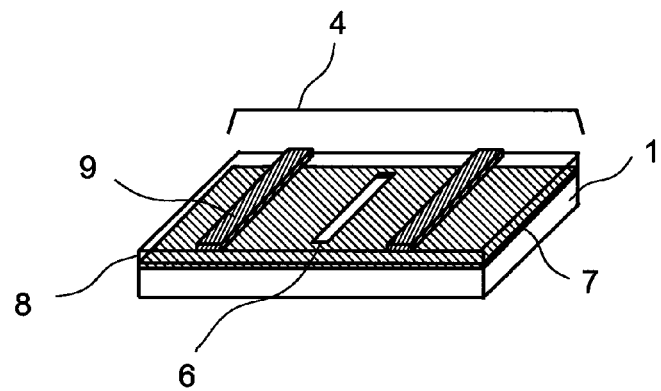
FIG. 5 is a diagram illustrating a structure of an A-electrode structure of the second embodiment.

The second embodiment will be described below with reference to FIG. 5. In the present embodiment, each of the A-electrode structures 4 is formed of first conductive layer 7, insulating layer 8 and second conductive layer 9. The first conductive layer has a shape covering the entire of the A-electrode structures and opening section 6 elongated in one direction is formed in the first conductive layer. Insulating layer 8 and second conductive layer 9 are arranged on the first conductive layer. The second conductive layer is formed into stripe structures extending in one direction.

Figure 6:
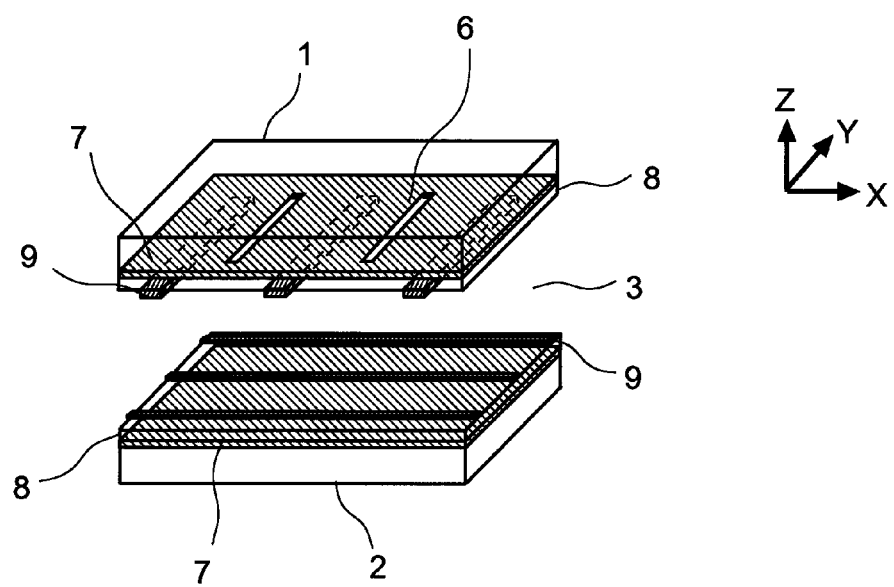
FIG. 6 is a diagram illustrating a structure of the liquid crystal lens element of the second embodiment.

FIG. 6 illustrates the construction of the liquid crystal lens element having the above electrode structures. In FIG. 6, upper substrate 1 includes a repetition area where the A-electrode structures shown in FIG. 5 are repeatedly arranged on the upper substrate 1. The extending direction of the structures formed of second conductive layer 9 in A-electrode structures 4 agrees with the Y-direction, in order to generate an electric potential gradient in the X-direction. The elongated direction of opening sections 6 agrees with the Y-direction. Lower substrate 2 includes a repetition area where the B-electrode structures each formed of first conductive layer 7, insulating layer 8 and stripe structures of second conductive layer 9 are repeatedly arranged on the lower substrate 2. As shown in FIG. 6, the structures formed of the second conductive layer 9 in each B-electrode structure are arranged so as to extend along the X-direction. Those members on the lower substrate 2 correspond to the B-electrode structures for generating an electric potential gradient in the Y-direction. Further, the orientation direction of liquid crystal molecules is set to agree with the X-direction in advance.

Figure 7A:
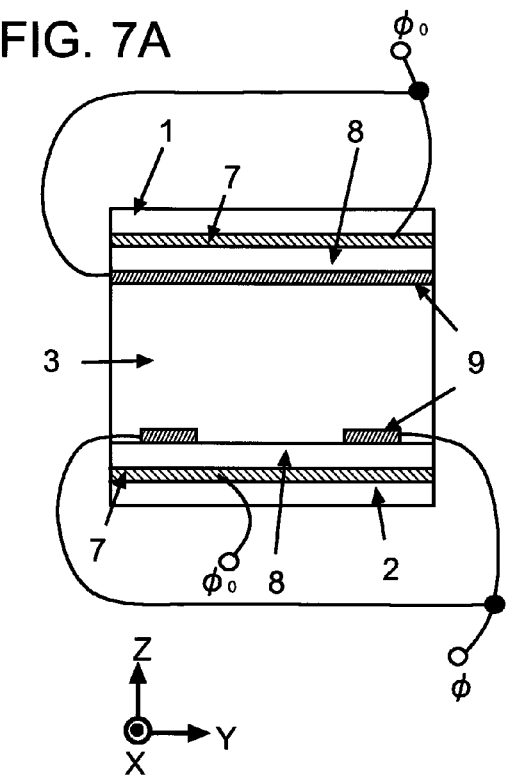
FIGS. 7A and 7B are diagrams illustrating a way to drive the liquid crystal lens element of the second embodiment.

Operations of the above liquid crystal lens element will be described with reference to the sectional views of FIGS. 7A and 7B. In FIG. 7A, the electric potentials of all the electrodes on upper substrate 1 are set to $\Phi 0$, the electric potential of first conductive layer 7 of lower substrate 2 is set to $\Phi 0$ and the electric potential of the structures of second conductive layer 9 of lower substrate 2 is set to $\Phi$, where $\Phi \neq \Phi 0$ holds. This structure generates an electric potential gradient along the Y-direction on lower substrate 2, and makes upper electrode 1 have the almost constant electric potential $\Phi 0$. Therefore, the electric potential to be applied to liquid crystal layer 3 has the value of $\Phi - \Phi 0$ around the structures of second conductive layer 9 of lower substrate 2. The electric potential difference is maximized around the structures of second conductive layer 9 of lower substrate 2 and the electric potential difference becomes small at the midpoints of neighboring structures of second conductive layer 9. This structure generates the state of alignment of liquid crystal molecules including repetition units each having a width along the Y-direction corresponding the distance between neighboring structures of second conductive layer 9, where the repetition units correspond to cylindrical lenses extending in the X-direction.

Figure 7B:
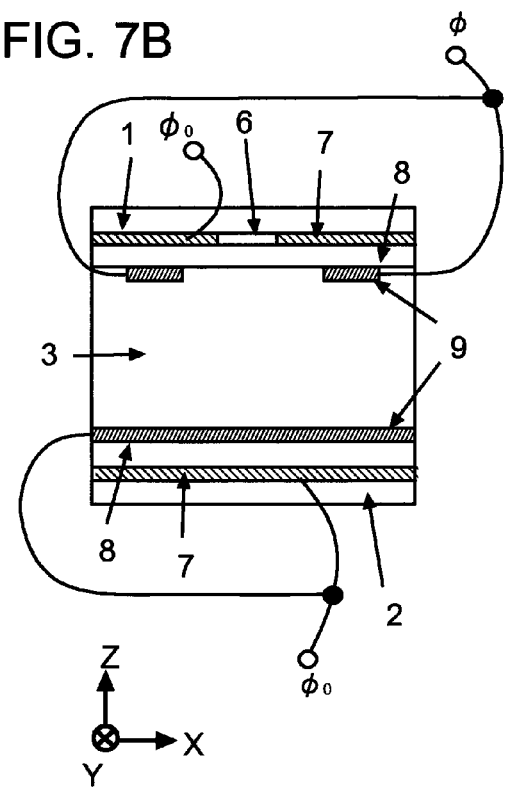

On the other hand, as shown in FIG. 7B, the electric potentials of all the electrodes on lower substrate 2 are set to $\Phi 0$, the electric potentials of first conductive layer 7 and the structures of second conductive layer 9 of upper substrate 1 are set to $\Phi 0$ and $\Phi$, respectively, where $\Phi \neq \Phi 0$ holds. This structure generates the state of alignment of liquid crystal molecules including repetition units each having a width along the X-direction corresponding the distance between neighboring structures of second conductive layer 9 on upper substrate 1, where the repetition units correspond to cylindrical lenses extending in the Y-direction.

As described above, the liquid crystal lens element of the present embodiment can provide properties of cylindrical lenses extending in the X-direction or the Y-direction depending on the settings of the electric potentials of the respective electrodes.

A third embodiment of the present invention has a structure that each of the A-electrode structures of the liquid crystal lens element of the first embodiment includes a first conductive layer, a first insulating layer, stripe structures formed of a second conductive layer, a second insulating layer and a resistive layer, which are layered on the upper substrate. The first conductive layers of the plurality of A-electrode structures form an electrode covering an entire of the upper substrate. The stripe structures of the second conductive layer extend in the Y-direction. The resistive layer has a sheet resistance whose value is between a value of a sheet resistance of the first or second conductive layer and a value of a sheet resistance of the second insulating layer.

The structure of the liquid crystal lens element of the third embodiment will be described with reference to FIG. 8. In the third embodiment, first conductive layer 7, first insulating layer 10, second conductive layer 9, second insulating layer 11 and resistive layer 12 are layered on upper substrate 1 to form the A-electrode structures 4. The first conductive layer 7 has a shape covering the entire of the A-electrode structures 4 and opening section 6 elongated in one direction is formed in the first conductive layer 7. The second conductive layer 9 is formed into stripe structures extending in one direction. The resistive layer has a shape covering the entire of each A-electrode structure.

Figure 8:
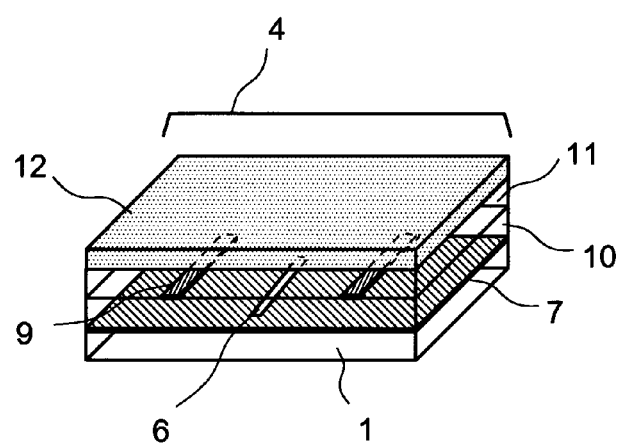
FIG. 8 is a diagram illustrating a structure of an A-electrode structure of the third embodiment.
Figure 9:
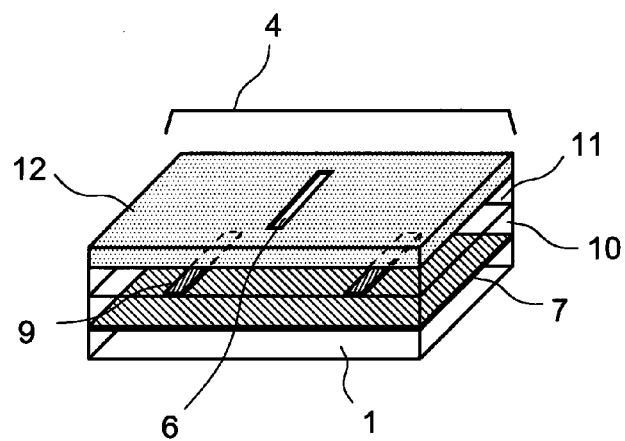
FIG. 9 is a diagram illustrating a structure of an A-electrode structure of the third embodiment.

Alternatively, as shown in FIG. 9, the liquid crystal lens element may have the same layered structure as that of FIG. 8 but opening section 6 may be formed in resistive layer 12. Opening sections 6 of both shown in FIGS. 8 and 9 make an influence to the electric potential around the middle of each A-electrode structure 4.

Figure 10:
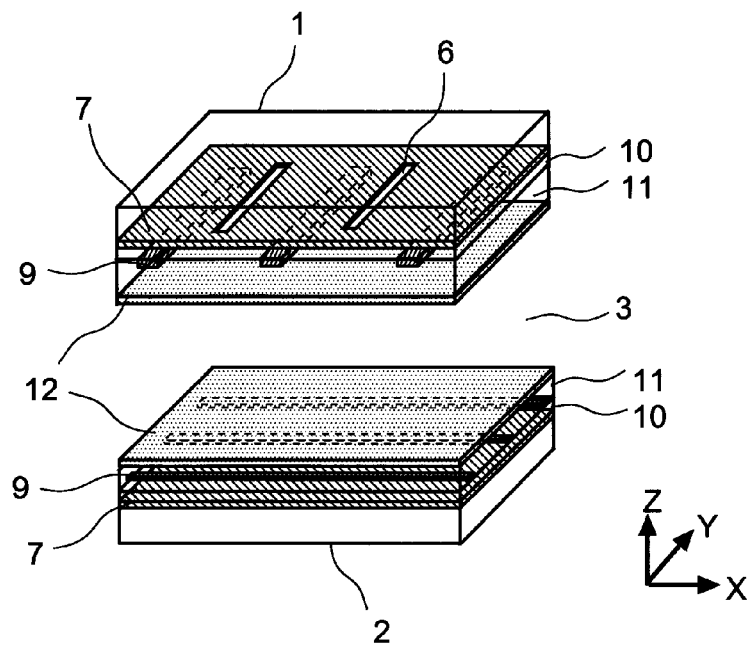
FIG. 10 is a diagram illustrating a structure of a liquid crystal lens element of the third embodiment.

A liquid crystal lens element formed by using A-electrode structures show in FIG. 8 will be described with reference to FIG. 10. In FIG. 10, A-electrode structures on upper substrate 1 are arranged so as to generate an electric potential gradient in the X-direction. The liquid crystal lens element employs, as the B-electrode structures on lower substrate 2, electrode structures which are similar as those of FIG. 8 but do not include opening sections. As can be seen from FIG. 10, each A-electrode structure includes structures of second conductive layer 9 extending in the Y-direction, and each B-electrode structure includes structures of second conductive layer 9 extending in the X-direction.

Operations of the above liquid crystal lens element will be described with reference to FIGS. 11A and 11B. In FIGS. 11A and 11B, the initial orientation of liquid crystal molecules is set to the X-direction. In FIG. 11A, the electric potentials of all the electrodes on upper substrate 1 are set to $\Phi 0$, the electric potential of first conductive layer 7 of lower substrate 2 is set to $\Phi 0$ and the electric potential of the structures of second conductive layer 9 of lower substrate 2 is set to $\Phi$, where $\Phi \neq \Phi 0$ holds. This structure generates an electric potential gradient along the Y-direction to be applied to the liquid crystal layer 3. This structure provides, as described above, the state of alignment of liquid crystal molecules corresponding to cylindrical lenses extending in the X-direction.

On the other hand, as shown in FIG. 11B, the electric potentials of all the electrodes on lower substrate 2 are set to $\Phi 0$, the electric potentials of first conductive layer 7 and the structures of second conductive layer 9 of upper substrate 1 are set to $\Phi 0$ and $\Phi$, respectively, which gives a gradient in the X-direction to the electric potential distribution to be applied to liquid crystal layer 3. This structure makes the alignment state of liquid crystal molecules symmetric in spite of the initial orientation direction of liquid crystal being the X-direction, because of the above-described function of opening sections 6. In this case, the liquid crystal lens element works as cylindrical lenses extending in the Y-direction.

As described above, the liquid crystal lens element of the present embodiment can realize both of the function of cylindrical lenses extending in the X-direction and the function of cylindrical lenses extending in the Y-direction.

A fourth embodiment of the present invention is a liquid crystal lens element comprising: an upper substrate and a lower substrate facing each other, and a liquid crystal layer put between the upper substrate and the lower substrate, where directions in which each of the upper substrate and the lower substrate extends are defined as a X-direction and a Y-direction which cross each other. An initial molecular orientation direction of the liquid crystal layer agrees with the X-direction. The upper substrate includes a repetition area in which a plurality of A-electrode structures are arrayed in the X-direction so as to generate an electric potential gradient in the X-direction. The lower substrate includes a repetition area in which a plurality of B-electrode structures are arrayed in the Y-direction so as to generate an electric potential gradient in the Y-direction. A central electrode elongated in the Y-direction is formed in the middle of each of the plurality of A-electrode structures.

The structure of the liquid crystal lens element of the fourth embodiment will be described with reference to FIG. 12. FIG. 12 illustrates a liquid crystal lens element composed of upper substrate 1, lower substrate 2 and liquid crystal layer 3 put between these substrates. On the substrates, there are arranged a repetition area in which A-electrode structures are arrayed in the X-direction and a repetition area in which B-electrode structures are arrayed in the Y-direction, respectively, where the A-electrode structures can generate an electric potential gradient in the X-direction and the B-electrode structures can generate an electric potential gradient in the Y-direction. Further, as shown in FIG. 12, there is arranged central electrode 13 extending in the Y-direction in the middle of each of the A-electrode structures. In this structure, the initial molecular orientation direction of liquid crystal is set to the X-direction.

Figure 13:
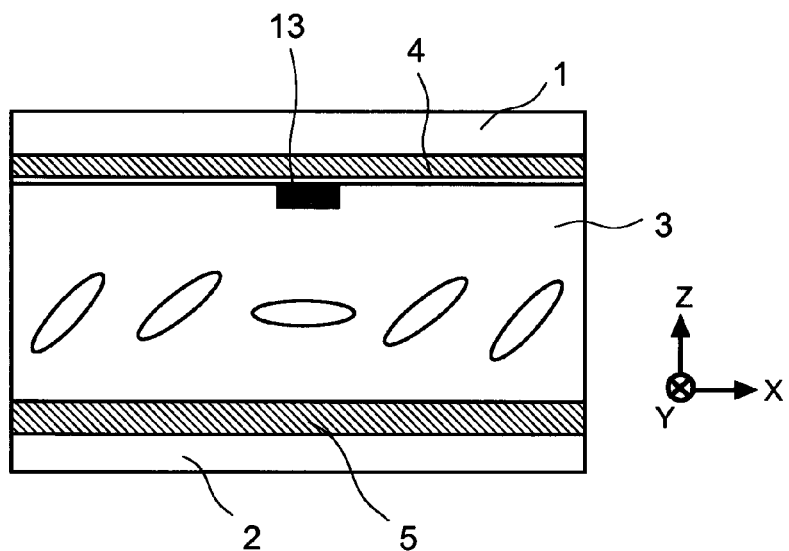
FIG. 13 is a diagram illustrating operations to orient molecules of liquid crystal of the liquid crystal lens element of the fourth embodiment.

Operations of the above liquid crystal lens element will be described with reference to FIG. 13, which is a sectional view illustrating a state of molecular alignment of liquid crystal. The molecules of liquid crystal are oriented in the X-direction in the initial state, which easily makes a situation that the alignment of liquid crystal molecules becomes asymmetry in the cross section taken along the X-direction, as the description about FIGS. 4A to 4C. In the present embodiment, the voltage of liquid crystal layer 3 directly under the central electrode 13 can be defined by supplying a constant electric potential to central electrode 13. For example, in the structure of FIG. 13, setting the electric potential of central electrode 13 to be the same as that of B-electrode structure 5 makes the state that no voltage is applied to liquid crystal layer 3 directly under the central electrode 13. By defining the electric potential of the middle part of each A-electrode structure 4 as described above, the liquid crystal lens element can generate a symmetric alignment of liquid crystal molecules as shown in FIG. 13.

A fifth embodiment of the present invention has a structure that each of the plurality of A-electrode structures is formed out of at least a first conductive layer and a second conductive layer. The first conductive layer has a sheet resistance whose value is smaller than a value of a sheet resistance of the second conductive layer. Each of the plurality of A-electrode structures includes a principal direction part extending in the X-direction, branch parts extending in the Y-direction, the central electrode extending in the Y-direction and side electrodes extending in the Y-direction which are arranged such that the principal direction part is connected to the branch parts, the central electrode and the side electrodes. The principal direction part includes the second conductive layer. Each of the branch parts, the central electrode and the side electrodes includes at least the first conductive layer.

Figure 14:
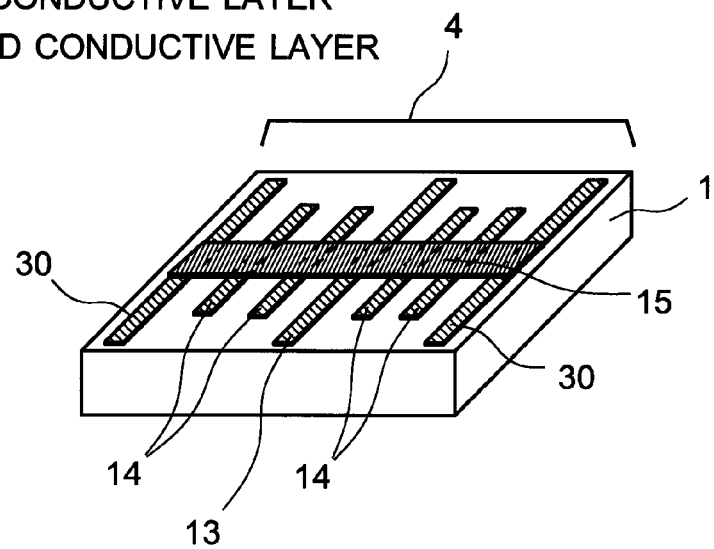
FIG. 14 is a diagram illustrating an A-electrode structure of the fifth embodiment.

The present embodiment will be described below with reference to FIGS. 14 and 15. FIG. 14 illustrates A-electrode structure 4 formed out of a first conductive layer and a second conductive layer on upper electrode 1. The sheet resistance of the first conductive layer is defined to be smaller than the sheet resistance of the second conductive layer. A-electrode structure 4 is composed of principal direction part 15 and branch parts 14, central electrode 13 and side electrodes 30. Principal direction part 15 extends in the horizontal direction of FIG. 14 and branch parts 14, central electrode 13 and side electrodes 30 extend to intersect with the principal direction part 15 at right angles. As shown in FIG. 14, principal direction part 15 overlaps with branch parts 14, central electrode 13 and side electrodes 30 to from contact sections. Principal direction part 15 is formed out of the second conductive layer with a relatively-high sheet resistance. On the other hand, branch parts 14, central electrode 13 and side electrodes 30 are formed out of the first conductive layer with a relatively-low sheet resistance, as shown in FIG. 14. Alternatively, as shown in FIG. 15, branch parts 14, central electrode 13 and side electrodes 30 may be formed out of the first conductive layer and the second conductive layer.

Figure 15:
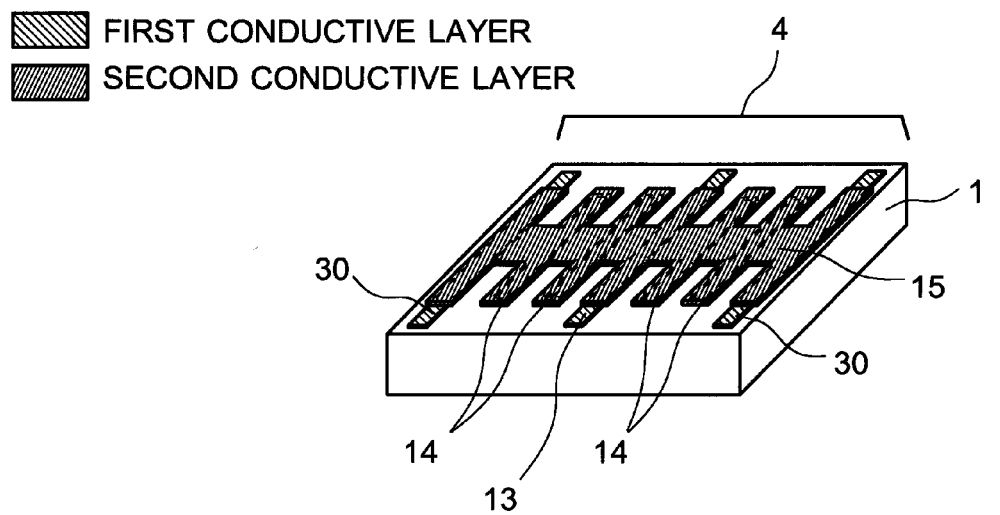
FIG. 15 is a diagram illustrating an A-electrode structure of the fifth embodiment.

The central electrode 13 and the side electrodes 30 extend outside the repetition area and are connected to an external power supply such that the electric potential is fixed, which is not illustrated in FIGS. 14 and 15. The side electrodes 30 at the left and right ends of FIGS. 14 and 15 are connected together and cause a short-circuit to be set to the same electric potential, and central electrode 13 is set to a different electric potential from that of the side electrodes 30. Since central electrode 13 is located in the middle of A-electrode structure 4, the electric potential distribution along the principal direction part 15 of FIGS. 14 and 15 has a symmetric shape around central electrode 13 as the symmetric axis. The branch parts 14 extend in the direction perpendicular to principal direction part 15 and are formed out of the first conductive layer having a smaller sheet resistance in comparison with the second conductive layer. Therefore, the electric potential in the A-electrode structure gradually changes along the principal direction part 15, and hardly changes along the branch parts 14. The equipotential lines have shapes almost parallel with the branch parts 14.

As described above, the electric potential of the middle part of each A-electrode structure 4 can be defined by central electrode 13. When molecules of liquid crystal are oriented in the parallel direction with principal direction part 15, the molecular alignment becomes parallel with the gradient direction of the electric potential. Under this situation, because of the effect of the pre-tilt angle as the description about FIG. 2A, the molecules can be easily in the asymmetric alignment state along the gradient direction of the electric potential in conventional structures. However, in the present embodiment, the electric potential in the middle of each A-electrode structure 4 is fixed and a symmetric alignment state of liquid crystal molecules can be obtained, because of the arrangement of central electrode 13.

A sixth embodiment is a display unit comprising a layered body including a display panel, a polarization plate and the liquid crystal lens element of one of the above embodiment, in this order.

By layering a display panel, a polarization plate and any one of the liquid crystal lens elements of the first to fifth embodiment, in this order, a display unit which can perform portrait stereoscopic display, landscape stereoscopic display and 2D display can be provided.

A seventh embodiment is a terminal equipped with the display unit of the sixth embodiment.

The above-described display unit can be mounted in a terminal. Especially, a terminal in which portrait stereoscopic display and landscape stereoscopic display can freely be changed is preferably equipped with the above display unit. Each of FIGS. 28A and 28B illustrates a perspective view of the terminal.

The above embodiments provide the following effects.

That is, a display unit and terminal which can carry out 2D display, portrait stereoscopic display and landscape stereoscopic display can be realized. Further, a liquid crystal lens element which exhibits equivalent cylindrical lens properties for both of the portrait stereoscopic display and the landscape stereoscopic display can be obtained.

EXAMPLES

Hereinafter, the embodiments of the present invention will be described more concretely with reference to the drawings.

First Example

Figure 16:
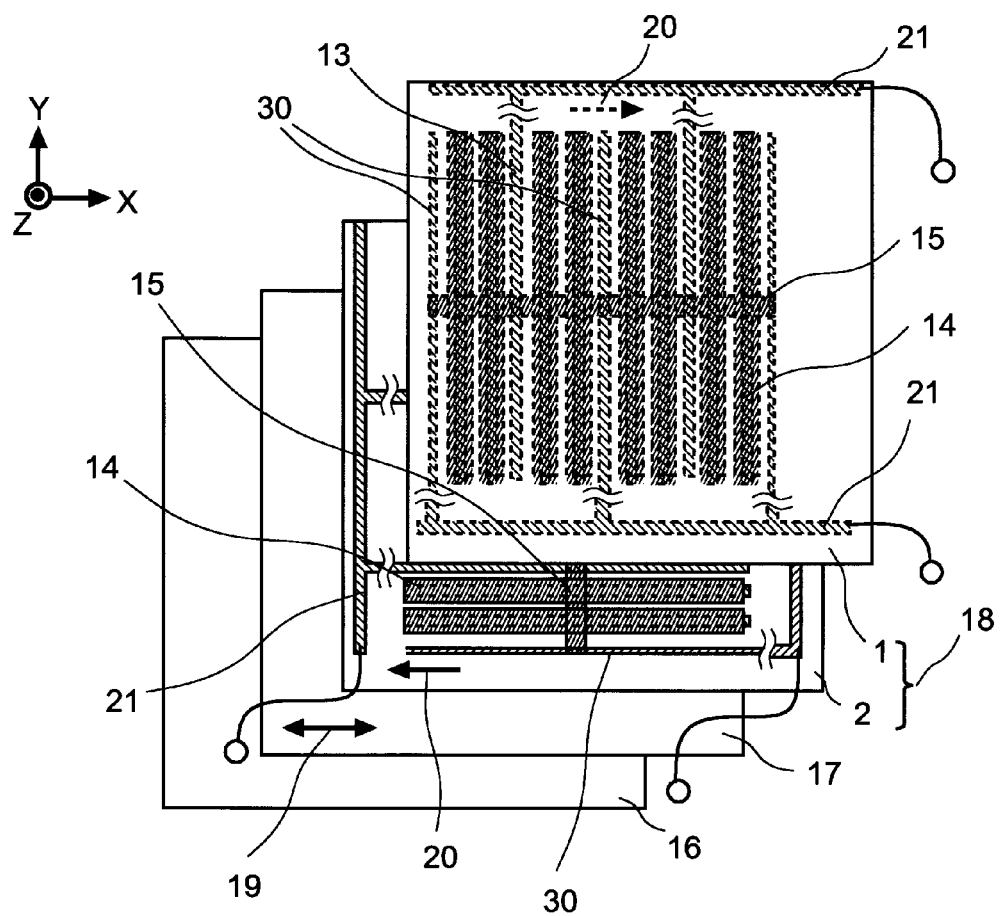
FIG. 16 is a construction diagram illustrating a display unit of the first example.

The first example will be described with reference to FIG. 16. In the present example, liquid crystal display panel 16 is used as the display panel (display unit) of the above embodiments. There are provided polarization plate 17 and liquid crystal lens element 18 on liquid crystal display panel 16. FIG. 16 further shows transmission axis 19 of the polarization plate 17. The liquid crystal lens element 18 is composed of upper substrate 1, liquid crystal layer and lower substrate 2. FIG. 16 further shows orientation direction 20 of liquid crystal molecules.

Figure 17:
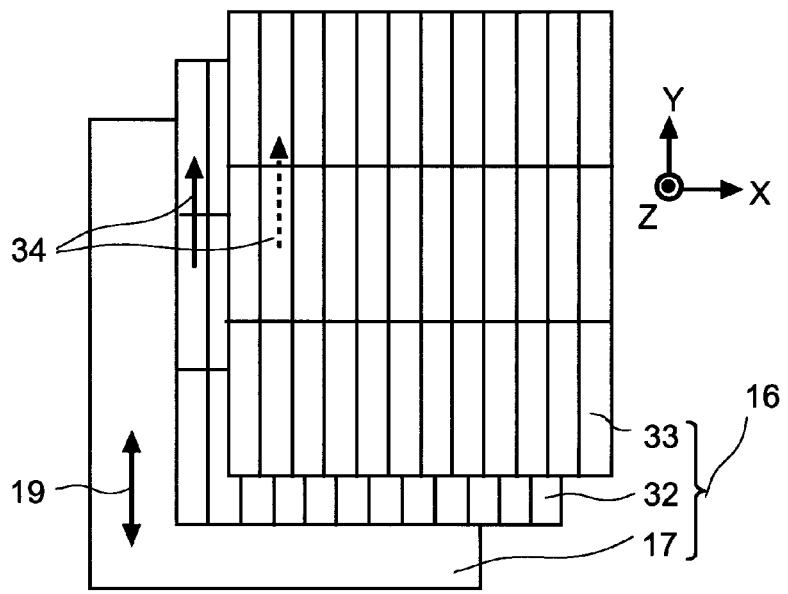
FIG. 17 is a diagram illustrating a structure of a liquid crystal display panel of the first example.

FIG. 17 illustrates a structure of liquid crystal display panel 16 shown in FIG. 16. Liquid crystal display panel 16 is composed of polarization plate 17, TFT (Thin Film Transistor) substrate 32, liquid crystal layer and color filter substrate 33. Polarization plate 17 is arranged such that the transmission axis 19 agrees with the Y-direction in FIG. 17. Regarding the orientation direction of liquid crystal molecules, the rubbing direction is defined so as to agree with the transmission axis 19 of polarization plate 17. In the present example, TFT substrate 32 and color filter substrate 33 are arranged so as to face each other and to make rubbing directions 34 of both of the substrates parallel with each other. TFT substrate 32 includes pixel areas in each of which a TFT element connected to a scan line and a signal line, a comb-shaped pixel electrode and a common electrode are arranged. Known technologies can be used for the arrangement and the manufacturing method of those elements.

Figure 18:
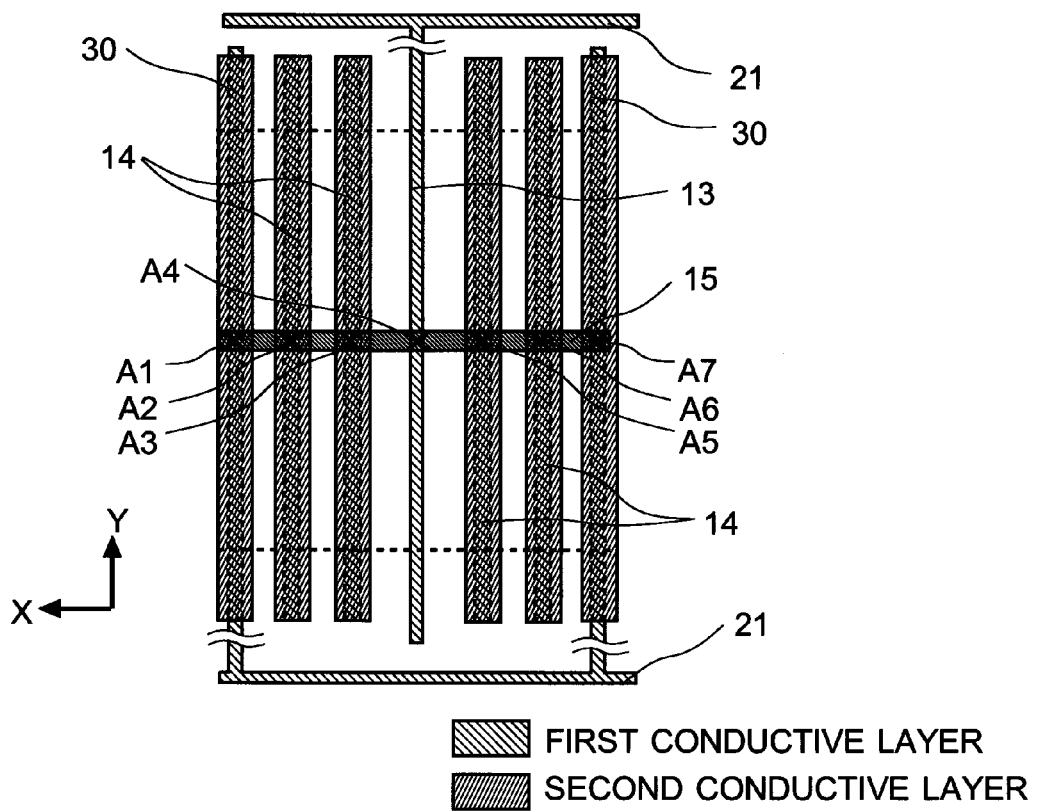
FIG. 18 is a diagram illustrating an arrangement of electrodes of the liquid crystal display panel of the first example.

The structure of liquid crystal lens element 18 will be described below. The liquid crystal lens element 18 is composed of upper substrate 1, lower substrate 2 and liquid crystal layer put between the upper substrate 1 and the lower substrate 2 as shown in FIG. 16. An arrangement of electrodes formed on the upper substrate 1 and the lower substrate 2 will be described with reference to FIG. 18. Upper substrate 1 may use the same electrode arrangement as that of lower substrate 2. However, when both of the substrates are arranged to face each other, one of the substrates is rotated by 90 degrees. On each of the substrates, a first conductive layer and a second conductive layer are formed and patterned, where the material of the first conductive layer has a lower resistance than that of the material of the second conductive layer. FIG. 18 illustrates an arrangement of electrodes formed on upper substrate 1, when turning the upper substrate 1 with its electrode surface facing upward. The electrodes on the upper substrate 1 include principal direction part 15 for determining the gradient direction of the electric potential, branch parts 14, central electrode 13 and side electrodes 30, which are connected together at seven contacts (A1 to A7). Principal direction part 15 is formed out of the second conductive layer and is connected to central electrode 13 at contact A4 to make an electrical connection to external terminal 21. Principal direction part 15 is further connected to the first conductive layer which has the smaller resistance and forms the side electrode at contact A1 to make an electrical connection to the other external terminal 21. Principal direction part 15 is further connected similarly to the first conductive layer which forms the side electrode at contact A7 to make an electrical connection to the other external terminal 21. As described above, external voltages are supplied to the middle part and sides parts of the principal direction part 15. FIG. 18 illustrates an area of the liquid crystal lens element corresponding to the width of one strip of liquid crystal lens as one unit. In other words, the area from contact A1 to contact A7 corresponds to the width of one cylindrical lens. Each of branch parts 14 has a shape extending from principal direction part 15 in the perpendicular direction, and is formed of a layered structure including the first conductive layer and the second conductive layer. Such a structure supplies an electric potential which is uniform in the vertical direction to the electrodes, which realizes lenses elongated in the vertical direction in the liquid crystal lens element.

As the first conductive layer, a transparent conductive layer made of a material whose sheet resistance is relatively small, such as ITO (Indium Tin Oxide), can be used. On the other hand, as the second conductive layer whose sheet resistance is larger than that of the first conductive layer, a transparent thin layer made of zinc oxide can be used. Those transparent conductive layers can be deposited through a layering process such as sputtering and vapor deposition. Further, those transparent conductive layers can be patterned to form electrodes through a general photolithography process.

After the electrodes are processed, oriented films are formed on the two substrates and a molecule-orientation treatment is performed on the oriented films. Then, the substrates are arranged to face each other with their principal direction parts 15 intersecting at right angles. For the above manufacturing method of the liquid crystal lens element, a well-known assembling process of a liquid crystal cell can be used.

As described above, liquid crystal display panel 16 and liquid crystal lens element 18 as structures shown in FIG. 16 have been prepared. Next, display operations to be carried out in the present example will be described.

For the 2D display, 0V voltages are applied to all the external terminals 21 of upper substrate 1 and lower substrate 2 in liquid crystal lens element 18.

On the other hand, for the portrait 3D display, non-zero voltage is applied to between external terminals 21 of upper substrate 1, and external terminals 21 of lower substrate 2 are set to 0V. The waveform of the voltage to be applied between the external terminals 21 of upper substrate 1 may be a sinusoidal wave or rectangular wave. By adjusting the frequency and amplitude of the voltage waveform, a voltage waveform which can exhibit the most suitable phase modulation function can be selected. Especially, there is known a voltage waveform by which the optical phase difference of liquid crystal is changed in a shape of a quadratic function, as a preferable waveform to provide a lens with small aberrations. As the way to adjust the optical phase difference so as to be fit with a desired function system, the fact that the optical phase difference can be adjusted by controlling the conductivity of a conductive layer and the dielectric constant of a dielectric layer forming the liquid crystal lens, has been described in the following references: JP-A No. 2011-17742; Susumu Sato, Masaru Uchida and Marenori Kawamura, "Liquid-Crystal Optical Device With Dielectric-Constant Distribution Layer" Japanese Liquid Crystal Conference (2010) PA52; and Susumu Sato, Masaru Uchida and Marenori Kawamura, "Drive Frequency Characteristics of Liquid-Crystal Optical Device with Impedance Distribution Layer" Japanese Liquid Crystal Conference (2011) PB49. As the result, cylindrical lenses with small aberrations extending along the vertical direction of the sheet of FIG. 16 are formed in the liquid crystal layer. The display unit of the present example can realize the portrait 3D display, by preparing pixels for the left eye and pixels for the right eye on liquid crystal display panel 16 according to positions of the cylindrical lenses.

On the other hand, for the landscape 3D display, non-zero voltage is applied to between external terminals 21 of lower substrate 2, and external terminals 21 of upper substrate 1 are set to 0V. As the result, cylindrical lenses extending along the horizontal direction of the sheet of FIG. 16 are formed in the liquid crystal layer. The display unit of the present example can realize the landscape 3D display, by preparing pixels for the left eye and pixels for the right eye on liquid crystal display panel 16 according to positions of the cylindrical lenses.

As described above, the liquid crystal lens element, the display unit and the terminal equipped with the display unit of the present example can realize the 2D display, the portrait 3D display and the landscape 3D display.

Second Example

The second example will be described with reference to FIGS. 19A to 19C. The difference of the present example from the first example is only the arrangement of principal direction parts 15 and contacts in the liquid crystal lens element. Each of FIGS. 19A to 19C illustrates a structure of the liquid crystal lens element of the present example, that is, the electrode arrangement on the upper substrate with the electrode surface of the upper substrate facing upward. Each of FIGS. 19A and 19B illustrates a structure that plural principal direction parts 15 are prepared for a unit cylindrical lens, which is different from the structure shown in FIG. 18. Alternatively, one principal direction part 15 may be arranged for a unit cylindrical lens, with being displaced from the middle position of the unit cylindrical lens, as shown in FIG. 19C.

As described above, principal direction part 15 is provided for determining the direction of the voltage gradient, and plural principal direction parts 15 may be arranged at plural positions for one unit cylindrical lens as far as their directions agree with each other. Further, principal direction parts 15 may be arranged with being parallel translated. As described in the first example, a well-known assembling process of a liquid crystal cell may be used for the manufacturing process of a liquid crystal lens element using the above substrates.

Third Example

Figures 21A, 21B, 21C:
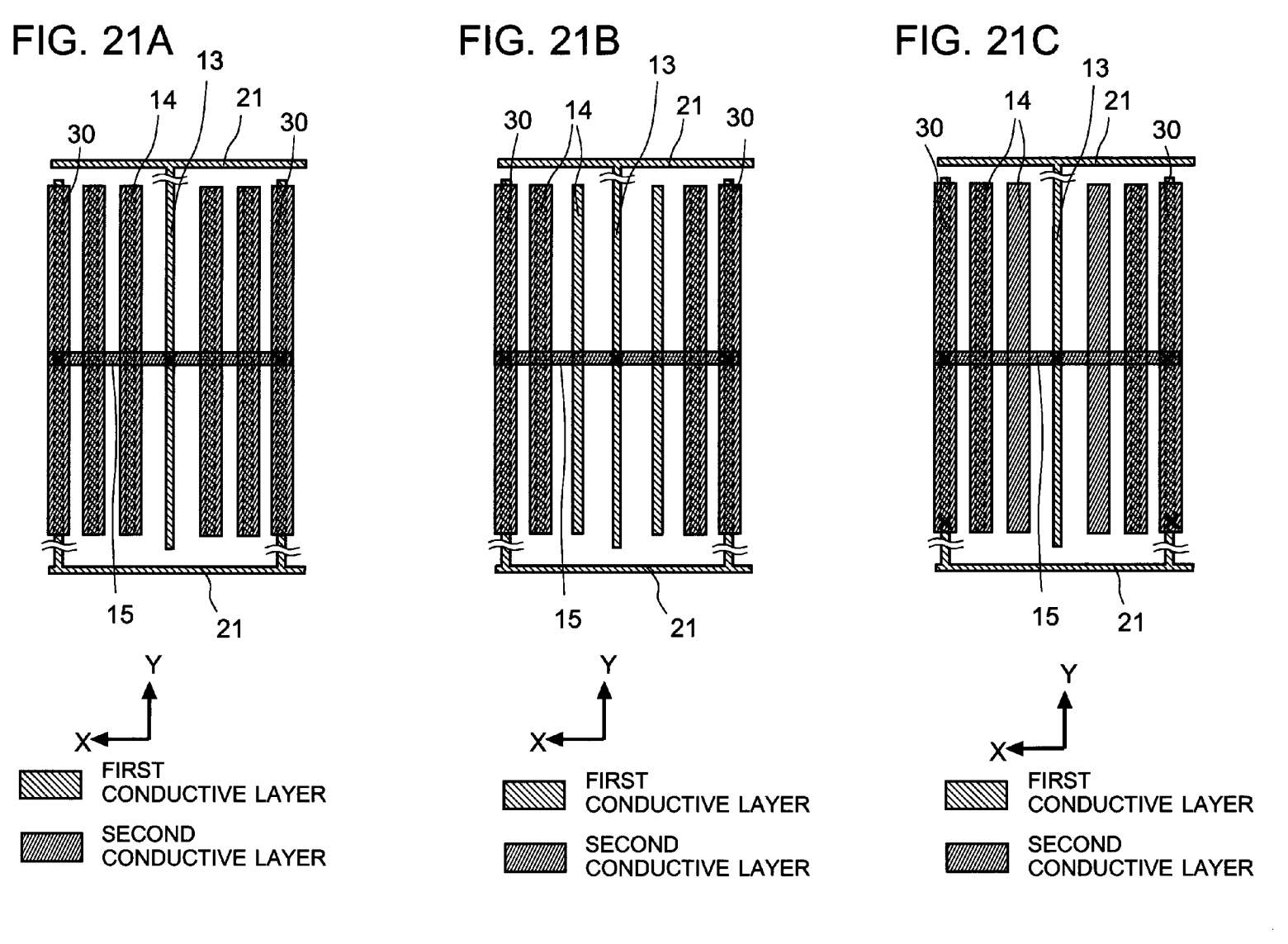

The third example will be described with reference to FIGS. 20A, 20B, and 21A to 21C. Each of FIGS. 20A, 20B, and 21A to 21C illustrates an electrode arrangement on the upper substrate with the electrode surface of the upper substrate facing upward. The difference of the present example from the first example is the structure of branch parts 14 in a liquid crystal lens element. Each of FIGS. 20A and 20B illustrates a structure of a liquid crystal lens element of the present example. In FIG. 20A, branch parts 14 are formed out of only the first conductive layer. In FIG. 20B, branch parts 14 are composed of a part formed out of only the first conductive layer and a part formed out of only the second conductive layer. Alternatively, a part of the whole of branch parts 14 may be formed by using a layered structure including the first conductive layer and the second conductive layer, as shown in FIGS. 21A, 21B and 21C.

Branch parts 14 are provided for expanding the equipotential area in the direction perpendicular to the extending direction of principal direction part 15. In other words, in FIGS. 20A and 20B, principal direction part 15 extends in the horizontal direction and branch parts 14 extend in the vertical direction. Thereby, the equipotential lines have elongated shapes in the vertical direction. As described above, plural branch parts 14 can be arranged at plural position as far as the extending directions of branch parts 14 agree with each other. Further, by modifying the structure of branch parts 14, an arbitrary electric potential distribution can be formed. Thereby, the phase speed of the polarized light and the phase modulation on performing the lens drive can be controlled precisely in the liquid crystal lens element of the present example.

Fourth Example

Fourth example will be described with reference to FIG. 22. The difference of the present example from the first example is the structure of liquid crystal lens element 18. The structure of the liquid crystal lens element 18 of the present example is the same as that shown in FIG. 6. Hereinafter, the manufacturing method of this liquid crystal lens element will be described. Glass substrates are prepared as upper substrate 1 and lower substrate 2. Then, a transparent conductive layer is formed through sputtering by using a material such as ITO on each of the glass substrates to be first conductive layer 7, and is patterned. In the patterning process, opening sections 6 are formed in the first conductive layer 7. After that, an insulating layer made of silicon oxide is formed through sputtering on the structure. After that, another transparent conductive layer made of ITO is further formed on the structure and is patterned into stripe-shaped structures made of second conductive layer 9. By using those steps, two substrates are prepared. After that, manufacturing steps of liquid crystal cell, which include a process forming oriented films and an orientation process, are performed, and then, the two substrates are arranged such that the direction of the stripe structures of the second conductive layer on one of the substrates intersects with that on the other substrate at right angles. After this process, liquid crystal is put between the substrates.

Figure 22:
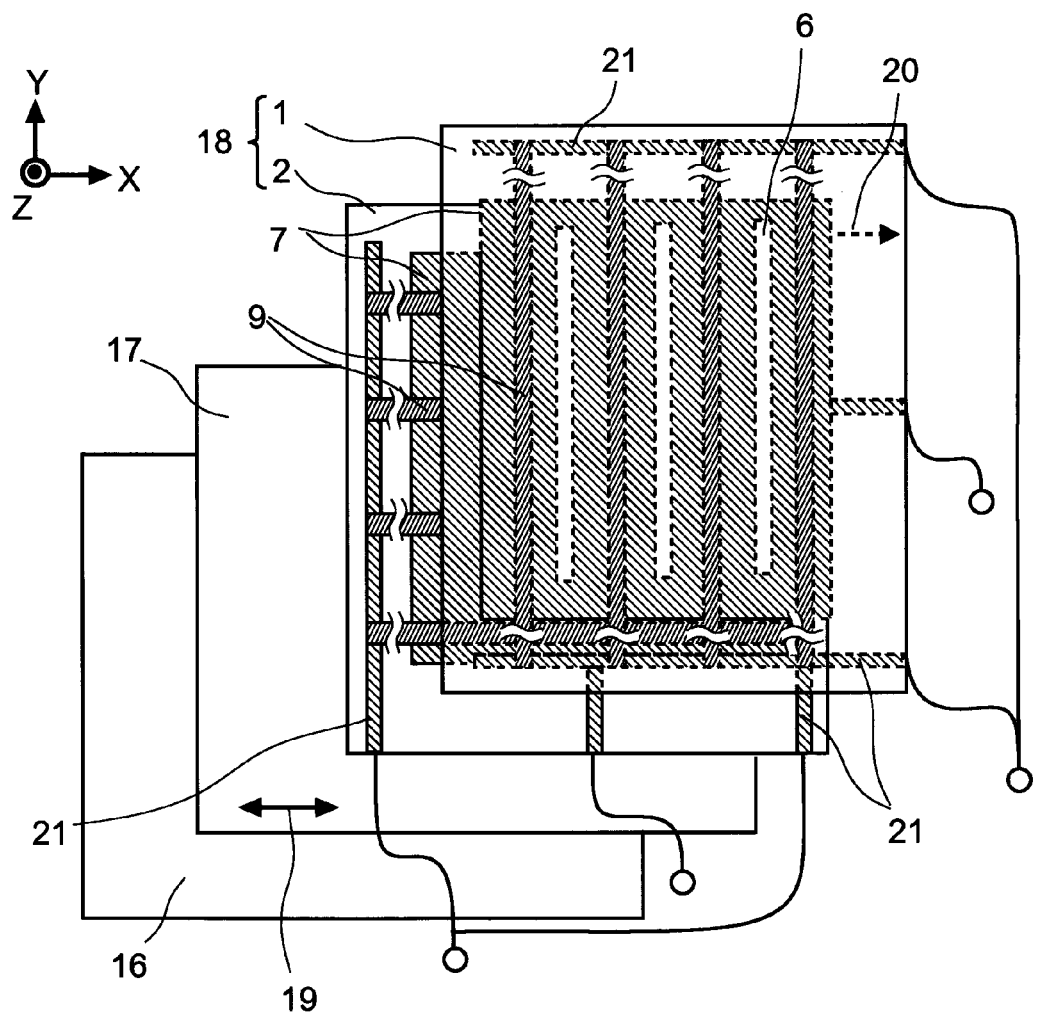
FIG. 22 is a construction diagram illustrating a display unit of the fourth example.
Figure 23:
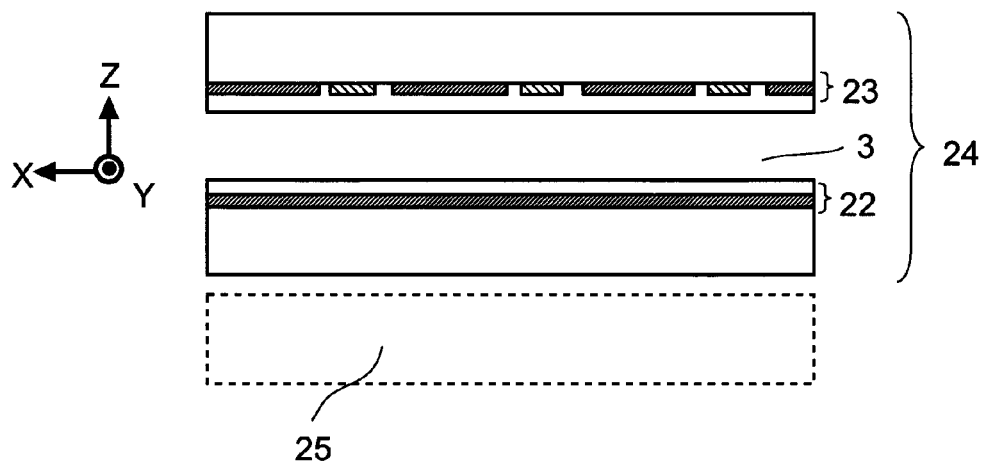
FIG. 23 is a sectional view illustrating a structure of a conventional lens array element.
Figure 24:
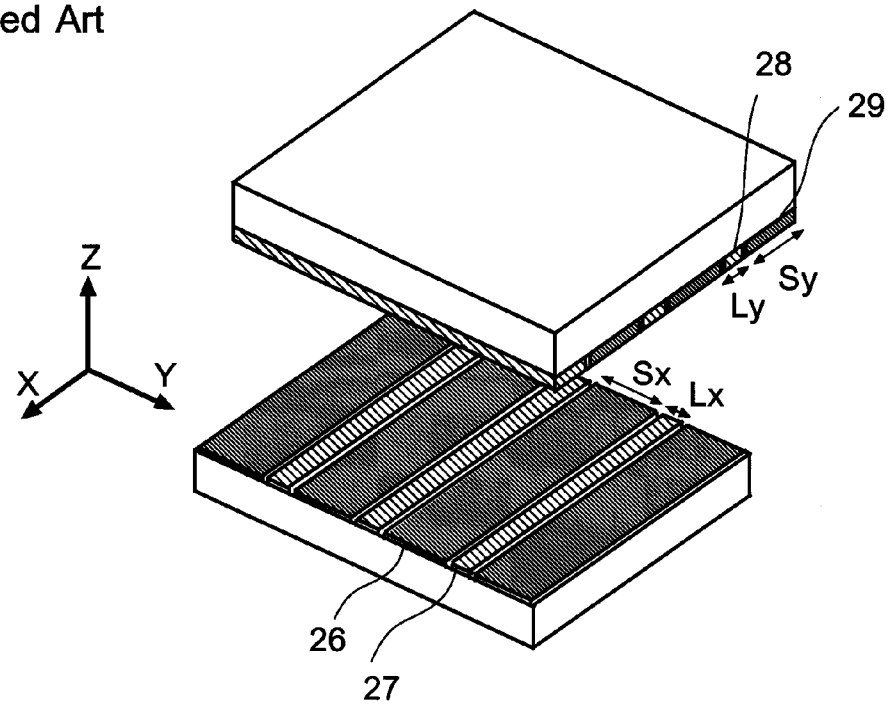
FIG. 24 is a perspective view illustrating a structure of a conventional lens array element.

The above-described liquid crystal lens element 18 includes, as shown in FIG. 22, two external terminals 21 on each of the upper substrate and the lower substrate. The way to apply a voltage to the liquid crystal lens element 18 when the vertical cylindrical lenses and the horizontal cylindrical lenses are driven, is same as that of the structure shown in FIGS. 7A and 7B. As described above, the liquid crystal lens element, the display unit and the terminal equipped with the display unit of the present example can realize the 2D display, the portrait 3D display and the landscape 3D display.

Fifth Example

The fifth example will be described below. A liquid crystal lens element of the present example has the structure shown in FIG. 8, which is different from that of the fourth example. Hereinafter, the manufacturing method of this liquid crystal lens element will be described. Processing steps of first conductive layer 1, first insulating layer 10 and second conductive layer 9 are the same as those of the fourth example, which have already been described. Additionally, second insulating layer 11 and resistive layer 12 are arranged in the present example. Resistive layer 12 is formed of a material having a sheet resistance which has a value between the sheet resistances of first conductive layer 7 (or second conductive layer 9) and second insulating layer 11. Resistive layer 12 is preferably transparent and preferably has the resistance whose value is controllable. The above-described thin layer made of zinc oxide is cited as an example of such the resistive layer 12.

The scope of the present invention is not limited to the aforementioned embodiment. Disclosed configurations and controlling operations of the aforementioned embodiment of the present invention can be varied by a skilled person without departing from the spirit and scope of the invention.

The invention claimed is:
1. A liquid crystal lens element comprising:
an upper substrate and a lower substrate facing each other, directions in which each of the upper substrate and the lower substrate extends being defined as a x-direction and a y-direction, the x-direction and the y-direction crossing each other, the upper substrate including a repetition area in which a plurality of A-electrode structures are arrayed in the x-direction so as to generate an electric potential gradient in the x-direction, the lower substrate including a repetition area in which a plurality of B-electrode structures are arrayed in the y-direction so as to generate an electric potential gradient in the y-direction;
an opening section elongated in the y-direction and being formed in a middle of each of the plurality of A-electrode structures in the x-direction; and
a liquid crystal layer between the upper substrate and the lower substrate, an initial molecular orientation direction of the liquid crystal layer agreeing with the x-direction,
wherein each of the plurality of A-electrode structures includes a first conductive layer, a first insulating layer, stripe structures formed of a second conductive layer, a second insulating layer and a resistive layer, which are layered on the upper substrate,
the first conductive layers of the plurality of A-electrode structures form an electrode covering an entire of the upper substrate,
the stripe structures extend in the y-direction, and
the resistive layer has a sheet resistance whose value is between a value of a sheet resistance of the first conductive layer or the second conductive layer and a value of a sheet resistance of the second insulating layer.
2. A liquid crystal lens element comprising:
an upper substrate and a lower substrate facing each other, directions in which each of the upper substrate and the lower substrate extends being defined as a x-direction and a y-direction, the x-direction and the y-direction crossing each other, the upper substrate including a repetition area in which a plurality of A-electrode structures are arrayed in the x-direction so as to generate an electric potential gradient in the x-direction, the lower substrate including a repetition area in which a plurality of B-electrode structures are arrayed in the y-direction so as to generate an electric potential gradient in the y-direction;
a central electrode elongated in the y-direction and being formed in a middle of each of the plurality of A-electrode structures in the x-direction; and a liquid crystal layer between the upper substrate and the lower substrate, an initial molecular orientation direction of the liquid crystal layer agreeing with the x-direction, wherein each of the plurality of A-electrode structures is formed out of at least a first conductive layer and a second conductive layer, the first conductive layer having a sheet resistance whose value is smaller than a value of a sheet resistance of the second conductive layer, each of the plurality of A-electrode structures includes a principal direction part extending in the x-direction, branch parts extending in the y-direction, the central electrode extending in the y-direction and side electrodes extending in the y-direction which are arranged such that the principal direction part is connected to the branch parts, the central electrode and the side electrodes, the principal direction part includes the second conductive layer, and each of the branch parts, the central electrode and the side electrodes includes at least the first conductive layer.

3. A liquid crystal lens element comprising:

an upper substrate and a lower substrate facing each other, directions in which each of the upper substrate and the lower substrate extends being defined as a x-direction and a y-direction, the x-direction and the y-direction crossing each other, the upper substrate including a repetition area in which a plurality of A-electrode structures are arrayed in the x-direction so as to generate an electric potential gradient in the x-direction, the lower substrate including a repetition area in which a plurality of B-electrode structures are arrayed in the y-direction so as to generate an electric potential gradient in the y-direction, an opening section elongated in the y-direction being formed in a middle of each of the plurality of A-electrode structures; and a liquid crystal layer arranged between the upper substrate and the lower substrate, an initial molecular orientation direction of the liquid crystal layer agreeing with the x-direction, wherein each of the plurality of A-electrode structures includes a first conductive layer, a first insulating layer, stripe structures formed of a second conductive layer, a second insulating layer and a resistive layer, which are layered on the upper substrate, the first conductive layers of the plurality of A-electrode structures form an electrode covering an entire of the upper substrate, the stripe structures extend in the y-direction, and the resistive layer has a sheet resistance whose value is between a value of a sheet resistance of the first conductive layer or the second conductive layer and a value of a sheet resistance of the second insulating layer.

4. A liquid crystal lens element comprising:

an upper substrate and a lower substrate facing each other, directions in which each of the upper substrate and the lower substrate extends being defined as a x-direction and a y-direction, the x-direction and the y-direction crossing each other, the upper substrate including a repetition area in which a plurality of A-electrode structures are arrayed in the x-direction so as to generate an electric potential gradient in the x-direction, the lower substrate including a repetition area in which a plurality of B-electrode structures are arrayed in the y-direction so as to generate an electric potential gradient in the y-direction, a central electrode elongated in the y-direction being formed in a middle of each of the plurality of A-electrode structures; and a liquid crystal layer arranged between the upper substrate and the lower substrate, an initial molecular orientation direction of the liquid crystal layer agreeing with the x-direction, wherein each of the plurality of A-electrode structures is formed out of at least a first conductive layer and a second conductive layer, the first conductive layer having a sheet resistance whose value is smaller than a value of a sheet resistance of the second conductive layer, each of the plurality of A-electrode structures includes a principal direction part extending in the x-direction, branch parts extending in the y-direction, the central electrode extending in the y-direction and side electrodes extending in the y-direction which are arranged such that the principal direction part is connected to the branch parts, the central electrode and the side electrodes, the principal direction part includes the second conductive layer, and each of the branch parts, the central electrode and the side electrodes includes at least the first conductive layer.

* * * * *